United States Patent
Nishiwaki et al.

(10) Patent No.: US 7,254,456 B2
(45) Date of Patent: Aug. 7, 2007

(54) RECORDING MEDIUM AND REPRODUCING APPARATUS FOR QUANTIZED DATA

(75) Inventors: Hirohisa Nishiwaki, Yokohama (JP); Hideki Mimura, Yokohama (JP); Shigeru Todokoro, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 196 days.

(21) Appl. No.: 10/895,289

(22) Filed: Jul. 21, 2004

(65) Prior Publication Data

US 2004/0260417 A1 Dec. 23, 2004

Related U.S. Application Data

(62) Division of application No. 09/163,190, filed on Sep. 30, 1998, now Pat. No. 7,054,697, which is a division of application No. 08/821,761, filed on Mar. 20, 1997, now Pat. No. 5,892,848.

(30) Foreign Application Priority Data

Mar. 21, 1996 (JP) .................. 8-064814
Mar. 21, 1996 (JP) .................. 8-064865

(51) Int. Cl.
    *G06F 17/00* (2006.01)
(52) U.S. Cl. ........................ 700/94; 386/106
(58) Field of Classification Search .............. 700/94; 382/232, 276; 386/106
    See application file for complete search history.

(56) References Cited

U.S. PATENT DOCUMENTS

| 4,704,640 A | 11/1987 | Okamoto et al. |
| 5,257,271 A | 10/1993 | Lagadec et al. |
| 5,440,404 A | 8/1995 | Okamoto |
| 5,500,853 A | 3/1996 | Engdahl et al. |
| 5,566,192 A | 10/1996 | Moon |
| 5,892,848 A | 4/1999 | Nishiwaki et al. |

FOREIGN PATENT DOCUMENTS

| EP | 0 325 477 | 7/1989 |
| EP | 0 558 852 | 9/1993 |
| EP | 0 795 859 | 9/1997 |
| EP | 0 797 199 | 9/1997 |
| EP | 0 797 203 | 9/1997 |
| JP | 55-52514 | 4/1980 |
| JP | 56-21446 A | 2/1981 |

(Continued)

*Primary Examiner*—Brian T. Pendleton
(74) *Attorney, Agent, or Firm*—Pillsbury Winthrop Shaw Pittman, LLP

(57) ABSTRACT

A data arranging method for linear PCM data, which allows both low cost and high cost machines to easily perform a reproduction process and can cope with multiple channels. Data having a structure in which each sample data of 20 bits or 24 bits of individual channels is separated to a main word consisting of 16 bits and an extra word consisting of 4 or 8 bits, a collection of 2n-th main words of the individual channels is arranged, a collection of (2n+1)-th main words of the individual channels is then arranged, a collection of 2n-th extra words of the individual channels is then arranged, and a collection of (2n+1)-th extra words of the individual channels is then arranged, is recorded on a recording medium or transferred.

4 Claims, 26 Drawing Sheets

```
CHANNEL A → A0 a0 A1 a1 A2 a2 A3 a3  · · · · ·
CHANNEL B → B0 b0 B1 b1 B2 b2 B3 b3  · · · · ·
CHANNEL C → C0 c0 C1 c1 C2 c2 C3 c3  · · · · ·
CHANNEL D → D0 d0 D1 d1 D2 d2 D3 d3  · · · · ·
              ⋮
CHANNEL H → H0 h0 H1 h1 H2 h2 H3 h3  · · · · ·
```

FOR QUANTIZATION BITS BEING 20 BITS, EACH OF An TO Hn CONSISTS OF 16 BITS AND EACH OF an TO hn CONSISTS OF 4 BITS

FOR QUANTIZATION BITS BEING 24 BITS, EACH OF An TO Hn CONSISTS OF 16 BITS AND EACH OF an TO hn CONSISTS OF 8 BITS

FOREIGN PATENT DOCUMENTS

| | | |
|---|---|---|
| JP | 57-207960 A | 12/1982 |
| JP | 60-201571 A | 10/1985 |
| JP | 1-282779 | 11/1989 |
| JP | 4-176060 | 6/1992 |
| JP | 4-101956 | 9/1992 |
| JP | 5-20794 A | 1/1993 |
| JP | 5-250811 | 9/1993 |
| JP | 06076473 A | 3/1994 |
| JP | 06139705 A | 5/1994 |
| JP | 06162671 A | 6/1994 |
| JP | 08022674 A | 1/1996 |
| JP | 08031104 A | 2/1996 |
| JP | 08063900 A | 3/1996 |
| JP | 08063901 A | 3/1996 |
| JP | 08289248 A | 11/1996 |
| JP | 08339637 A | 12/1996 |
| JP | 08340507 A | 12/1996 |
| JP | 9-078532 | 3/1997 |
| JP | 9-078533 | 3/1997 |
| JP | 9-083928 | 3/1997 |
| JP | 9-083929 | 3/1997 |
| JP | 09120645 A | 5/1997 |
| JP | 9-251717 | 9/1997 |
| JP | 9-251723 | 9/1997 |
| JP | 9-252449 | 9/1997 |
| JP | 09251717 A | 9/1997 |
| JP | 09251723 A | 9/1997 |
| JP | 09252449 A | 9/1997 |
| JP | 09265734 A | 10/1997 |

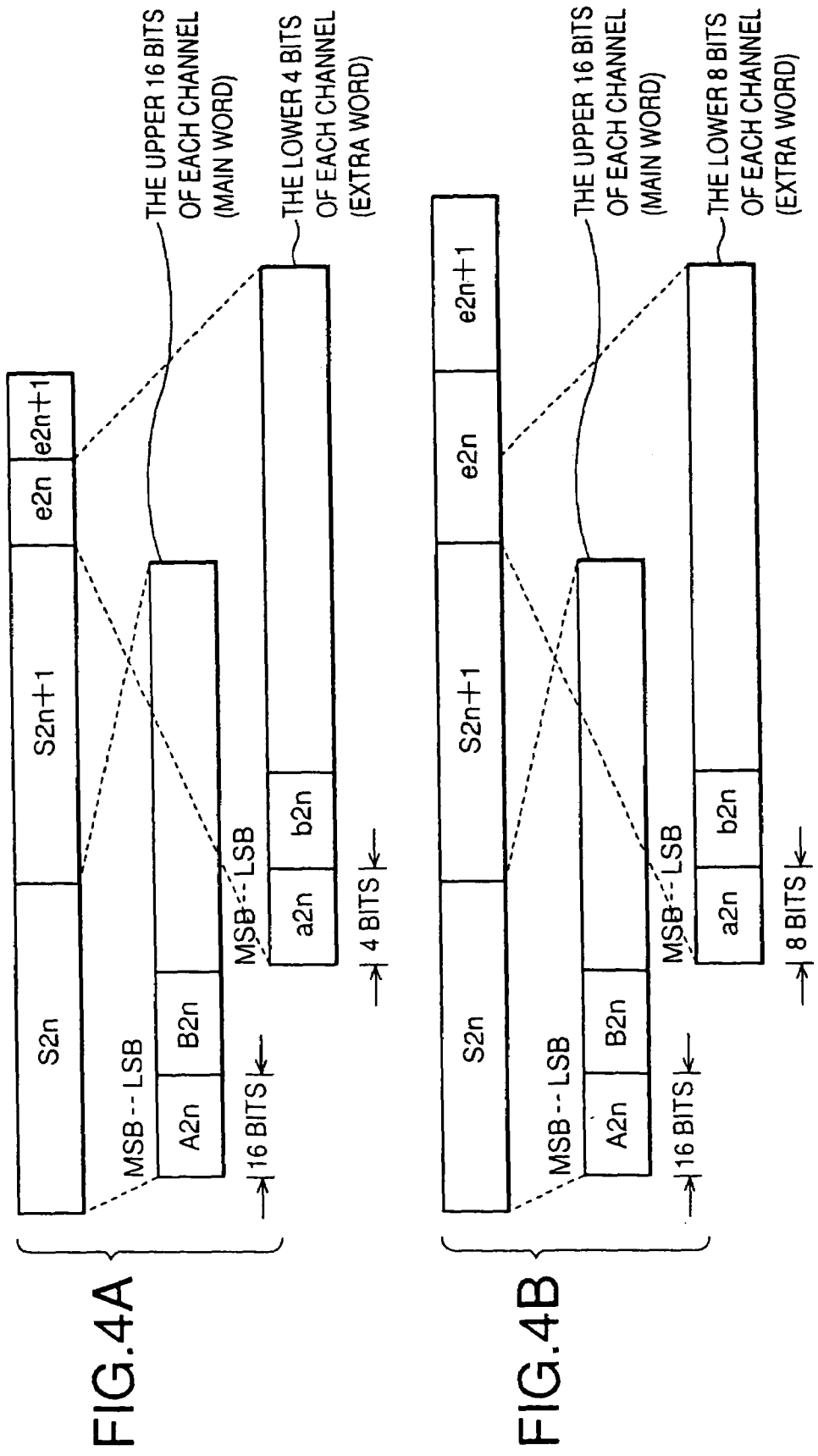

| Stream mode | | | Data in a packet | | | |
|---|---|---|---|---|---|---|
| Number of channels | fs (kHz) | Quantization (bits) | Maximum number of samples in a packet | Data size (bytes) | Packet stuffing of first/other PES packet (bytes) | Padding packet for first/other PES packet (bytes) |
| 1(mono) | 48/96 | 16 | 1004 | 2008 | 2/5 | 0/0 |
| | 48/96 | 20 | 804 | 2010 | 0/3 | 0/0 |
| | 48/96 | 24 | 670 | 2010 | 0/3 | 0/0 |
| 2(stereo) | 48/96 | 16 | 502 | 2008 | 2/5 | 0/0 |
| | 48/96 | 20 | 402 | 2010 | 0/3 | 0/0 |
| | 48/96 | 24 | 334 | 2004 | 6/0 | 0/9 |
| 3 | 48/96 | 16 | 334 | 2004 | 6/0 | 0/9 |
| | 48/96 | 20 | 268 | 2010 | 0/3 | 0/0 |
| | 48 | 24 | 222 | 1998 | 0/0 | 12/15 |
| 4 | 48/96 | 16 | 250 | 2000 | 0/0 | 10/13 |
| | 48 | 20 | 200 | 2000 | 0/0 | 10/13 |
| | 48 | 24 | 166 | 1992 | 0/0 | 18/21 |
| 5 | 48 | 16 | 200 | 2000 | 0/0 | 10/13 |
| | 48 | 20 | 160 | 2000 | 0/0 | 10/13 |
| | 48 | 24 | 134 | 2010 | 0/3 | 0/0 |
| 6 | 48 | 16 | 166 | 1992 | 0/0 | 18/21 |
| | 48 | 20 | 134 | 2010 | 0/3 | 0/0 |
| 7 | 48 | 16 | 142 | 1988 | 0/0 | 22/25 |
| 8 | 48 | 16 | 124 | 1984 | 0/0 | 26/29 |

FIG.8

| Field | Number of bits | Number of bytes | Value |
|---|---|---|---|
| Pack_start_code | 32 | 4 | 000001BAh |
| SCR | 48 | 6 | Provider defined |
| Program_mux_rate | 24 | 3 | 10.08Mbps |
| Pack_stuffing_length | 8 | 1 | no stuffing length=000b |

FIG.21

| Field | Number of bits | Number of bytes | Value | Comment |
|---|---|---|---|---|
| packet_start_code_prefix | 24 | 3 | 000001h | |
| stream_id | 8 | 1 | 101111101b | |
| PES_packet_length | 16 | 2 | | private_stream_1 |
| PES_information | 24 | 3 | | |
| PTS | 40 | 5 | | |
| buffer_size etc. | | 1 | | |
| | | 2 | | |
| stuffing_byte | | 0~7 | | |
| sub_stream_id | 8 | 1 | | |
| number_of_frame_heders | 8 | 3 | | |
| first_access_unit_pointer | 16 | | | |
| audio_emphasis_flag audio_mute_flag audio_frame_number quantization_word_lengh audio_sampling_frequency number_of_audio_channels dynamic_range_control | | 3 | | |
| audio data | | | | |

FIG.22

RECORDING MEDIUM AND REPRODUCING APPARATUS FOR QUANTIZED DATA

CROSS-REFERENCE TO RELATED APPLICATIONS

This is a Divisional Application of U.S. application Ser. No. 09/163,190, filed Sep. 30, 1998 now U.S. Pat. No. 7,054,697, now allowed, which is a Divisional of U.S. application Ser. No. 08/821,761, filed Mar. 20, 1997, now U.S. Pat. No. 5,892,848, both of which are based upon and claims the benefit of priority from prior Japanese Patent Application Nos. 8-064814, filed Mar. 21, 1996 and 8-064865, filed Mar. 21, 1996, the entire contents all of which are incorporated herein by reference.

BACKGROUND OF THE INVENTION

Field of the Invention

The present invention relates to a data arranging method and a medium for recording or transferring data or the like to be recorded on a digital video disk and a digital audio disk, and a signal processing apparatus for processing the data.

Recently, digital video disks have been developed as optical disks in addition to conventional compact disks (hereinafter referred to as "CDs") for audio usage, and players for such digital video disks have also been developed. In particular, the digital video disks include a kind which is about the same size 12 cm in diameter) as the conventional CDs and is designed such that about two hours of picture information can be recorded on and reproduced from that disk. For such a digital video disk, there is a format which allows voices or music in eight different languages and superimposition information in thirty-two different languages to be recorded on the same disk in addition to picture information.

Again, digital video disks which can record voices or music in multiple languages in addition to main picture information and are the same size as the conventional CDs have been developed.

If such digital video disks become available on the market, naturally, it would be a natural demand to reproduce pieces of music or voices (audio signals) from new digital video disks as well as from the conventional CDs. The recording systems for audio signals include a compression system and a linear PCM system. If one considered a video disk from which audio signals of pieces of music and voices can be reproduced by an exclusive audio player, it is effective to record data by the linear PCM technique as used for conventional CDs. It is very likely that both low-cost (inexpensive) and high-cost (expensive) types of video disk players become available on the market.

BRIEF SUMMARY OF THE INVENTION

Accordingly, it is an object of the present invention to provide a data arranging method and a medium for data recording or transfer, which are effective in recording or processing data or the like of a linear PCM system and which can record multi-channel signals of higher quality than that of the conventional CDs and can allow both low-cost and high-cost machines to easily perform a reproduction process, and a signal processing apparatus for processing such data.

To achieve the above object, according to this invention, a system for recording or transferring quantized data obtained by sampling one channel or multichannel signals in a time sequential manner and reproducing the quantized data handles a basic data structure in which M-bit sample data of each channel signal is separated into a main word consisting of m1 bits on an MSB (Most Significant Bit) side and an extra word consisting of m2 bits on an LSB (Least Significant Bit) side, a collection of main words of 2n-th sample data of individual channels is arranged as a main sample S2n, a collection of main words of (2n+1)-th sample data of individual channels is arranged next as a main sample S2n+1, a collection of extra words of 2n-th sample data of individual channels is arranged as an extra sample e2n, and a collection of extra words of (2n+1)-th sample data of individual channels is arranged as an extra sample e2n+1 (where n=0, 1, 2, ... ).

With the above structure, a reproduction circuit is easily accomplished in an inexpensive machine which reproduces only main words or only two channels of main words while a reproduction circuit for extra words has only to be added to a main word reproduction circuit in an expensive machine.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B are diagrams showing general audio data arrangements in a 20-bit mode and a 24-bit mode;

FIG. 8 is an explanatory diagram exemplifying a list of sizes of linear PCM data in a packet, to which this invention is adapted;

FIG. 21 is a table representing the contents of the pack header of the audio pack;

FIG. 22 is a table illustrating the contents of the packet header of the audio pack;

DETAILED DESCRIPTION OF THE INVENTION

Figure 1:
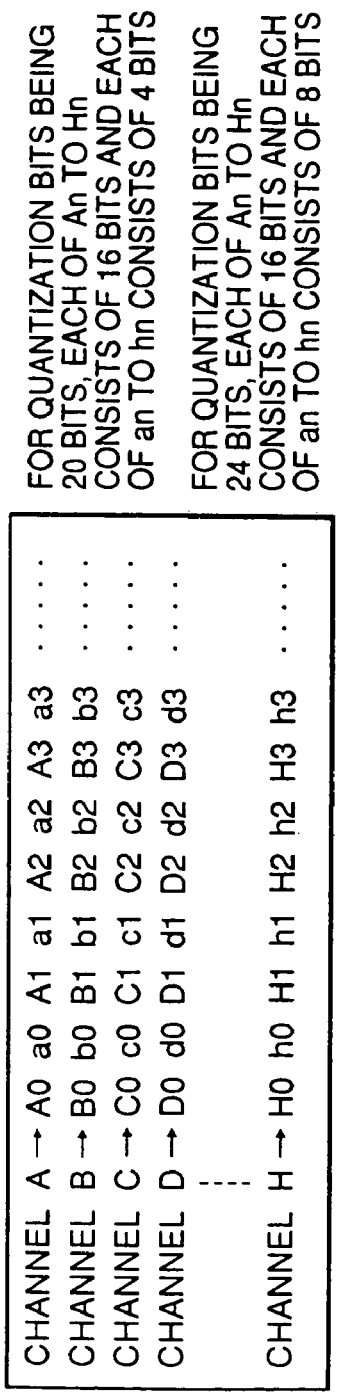
FIGS. 1A–1D are explanatory diagrams showing a sample structure and the arrangement of samples for explaining a basic embodiment of this invention.

Preferred embodiments of the present invention will now be described with reference to the accompanying drawings.

To begin with, a data arrangement by the linear PCM system in the data recording system according to this invention will be discussed. Note that 16 bits, 20 bits or 24 bits, for example, are arbitrarily used as quantization bits in linear PCM data. Further, audio modes include monaural, stereo, 3 channel, 4 channel, 5 channel, 6 channel, 7 channel, and 8 channel modes.

Suppose that there are eight channels (A to H) of audio signals. Those audio signals are sampled at a sampling frequency of 48 KHz or 96 KHz to be quantized. The following will describe an example where the quantization bits are 20 bits.

FIG. 1A shows how eight channels of audio signals A to H are sampled. It is assumed that each sample is quantized to, for example, 20 bits. It is also illustrated that each sample of 20 bits is separated into a main word and an extra word.

The main words of the individual channels are indicated by large alphabet letters plus a suffix "n", and the extra words by small alphabet letters plus the suffix "n", where n=0, 1, 2, 3, . . . , indicates the sampling order. Each main word consists of 16 bits and each extra word consists of 4 bits Individual samples are generated in the form of A0a0, A1a1, A2a2, A3a3, A4a4, and so forth for signal A; B0b0, B1b1, B2b2, B3b3, B4b4, and so forth for signal B; C0c0, C1c1, C2c2, C3c3, C4c4, and so forth for signal C; . . . ; H0h0, H1h1, H2c2, H3c3, C4c4, and so forth for signal H.

FIG. 1B illustrates the above word arrangement format as a sequence of samples in the case where those words are recorded on a recording medium.

First, each sample data consisting of 20 (=M) bits is separated to a main word of 16 (=m1) bits on the MSB side and an extra word of 4 (=m2) bits on the LSB side. Next, the zero-th (=2n-th) main words in the individual channels are collectively arranged. Then, the first (=(2n+1)-th) main words in the individual channels are collectively arranged. Then, the zero-th (=2n-th) extra words in the individual channels are collectively arranged. Then, the first (=(2n+1)-th) extra words in the individual channels are collectively arranged. Note that n=0, 1, 2, . . . .

A group of main words in the individual channels is one main sample. Likewise, a group of extra words in the individual channels is one extra sample.

With such a format employed, a data reproduction process by a low-cost machine (e.g., one which operates in a 16-bit mode) should handle only main words, while a data reproduction process by a high-cost machine (e.g., one which operates in a 20-bit mode) should handle both main words and their associated extra words.

FIG. 1C shows how individual samples are arranged by using the specific numbers of bits for the main sample and extra sample In the form of such quantized linear PCM codes, the separation of a 20-bit sample to a 16-bit main word and a 4-bit extra word can permit the following. The machine which operates in the 16-bit mode can easily discard unnecessary portions by performing data processing in 8 bit units in the areas of extra samples in the sample arrangement. This is because two extra samples are 4 bits×8 channels and 4 bits×8 channels, and those data can be processed (discarded) eight consecutive times in 8 bit units.

The feature of this data arrangement is not limited to that of this embodiment. In either case, where there are an odd number of channels, or where an extra word consists of 8 bits, the total number of bits of two consecutive extra samples is an integer multiple of 8 bits, so that a low-cost machine which reproduces only main words can skip extra samples by executing a discarding process n consecutive times 8 bits by 8 bits in accordance with the mode.

Data as shown in FIG. 1B may then be subjected to a modulation process to be recorded on a recording medium. If data is to be recorded together with other control information and video information, it is preferable that data should be recorded in the form that is easily managed on a time base in order to facilitate data handling and synchronization. In this respect, the following frame formation, grouping and packet formation is useful.

FIG. 1D shows a sequence of audio frames. The unit of data over a given reproduction time is ⅙₀₀ sec, which is one frame. In one frame, 80 or 160 samples are assigned. With a sampling frequency of 48 KHz, one sample is 1/48₀₀ sec and (1/48000)×80 samples=⅙₀₀ sec. With a sampling frequency of 96 KHz, one sample is 1/9600 sec and (1/96000)×160 samples=⅙₀₀ sec. Obviously, one frame consists of 80 samples or 160 samples.

Figure 2:
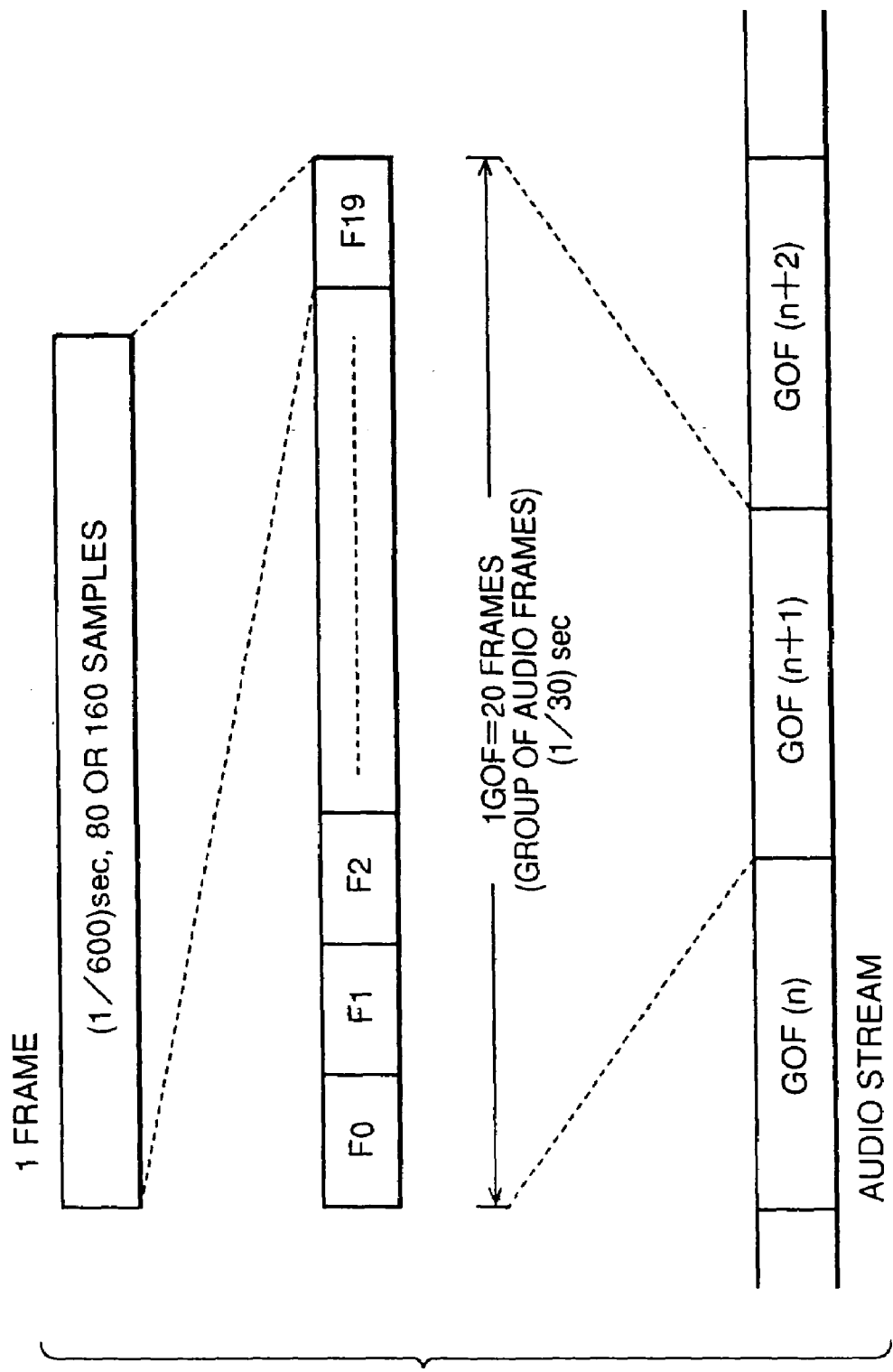
FIG. 2 is an explanatory diagram illustrating a relationship among the samples in FIG. 1D, a frame, and a group.

FIG. 2 shows a relationship between the aforementioned one frame and one GOF (Group Of Frames). One frame consists of 80 or 160 samples and is data of ⅙₀₀ sec, and one GOF consists of 20 frames. Thus, one GOF is (⅙₀₀) sec× 20=1/30 sec, which is the frequency of one TV frame. A sequence of such GOFs is an audio stream. This unit, GOF, becomes effective for synchronization with a video signal. As this frame is recorded together with other control signals and video signals, it is distributed to packets. The relationship between this packet and a frame will be described below.

Figure 3A:
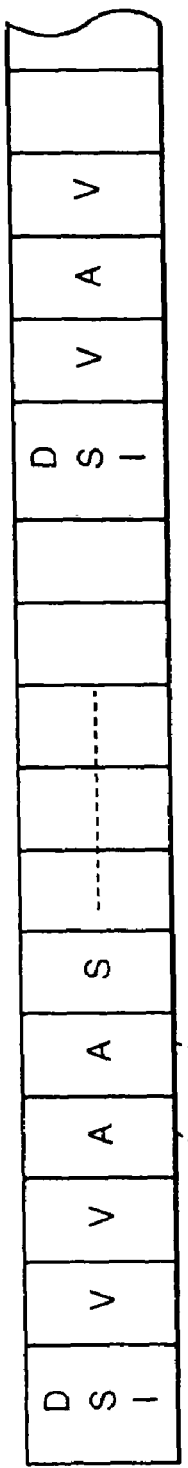
FIGS. 3A and 3B are explanatory diagrams illustrating a relationship between an audio frame and a sequence of packs according to this invention.

FIG. 3A shows the relationship between the packet and frame.

DSI is data search information, V is a video object, A is an audio object, and S is a sub picture object. Each block is called a pack. One pack is defined as 2048 bytes. One pack includes a pack header, a packet header, and a packet. Described in DSI is information for controlling each piece of data during playback, such as the start address and end address of each pack.

Figure 3B:
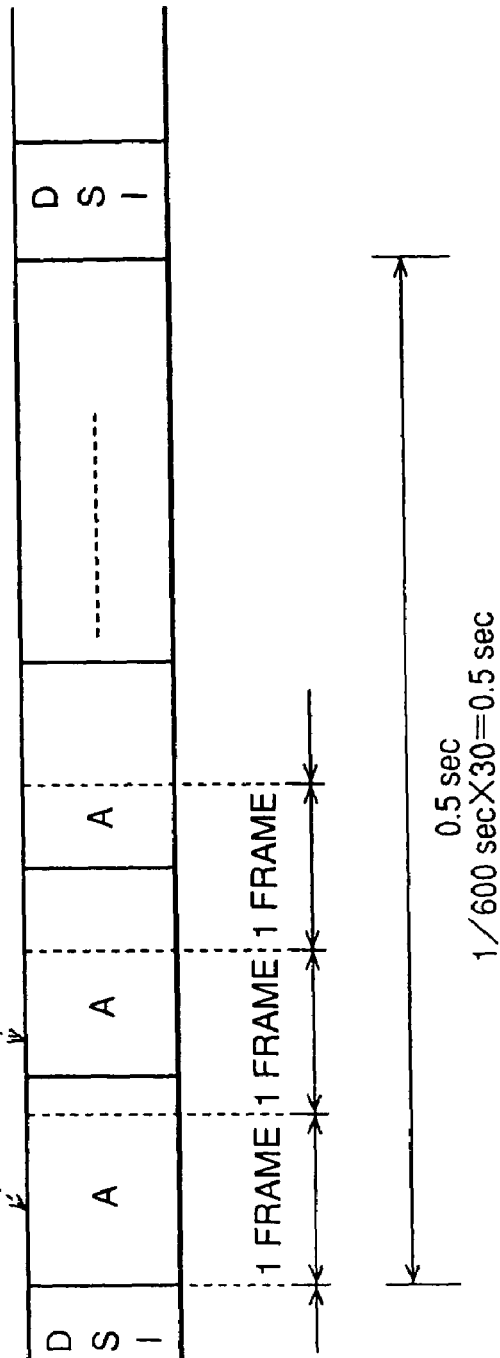

FIG. 3B shows only audio packs extracted. Although DSI packs, video packs V, and audio packs A are actually mixed in the arrangement as shown in FIG. 3A, only audio packs A are illustrated in FIG. 3B to help understand the relationship between a frame and packs. According to the standards of this system, information is arranged so that it takes about 0.5 sec to reproduce information between one DSI and the next DSI. As one frame is $1/600$ sec as mentioned above, 30 audio frames exist between one DSI and another DSI. The amount of data (D) of one frame varies depending on the sampling frequency (fs), the number of channels (N), and the number of quantization bits (m).

When fs=48 KHz, $D=80 \times N \times m$, and when fs=96 KHz, $D=160 \times N \times m$.

Therefore, one frame should not necessarily correspond to one pack. A plurality of frames or less than one frame may correspond to one pack. That is, the head of a frame may come in the middle of one pack as shown in FIG. 3B. Positional information of the head of a frame is described in the pack header, and is described as the number of data counts (timings) from the pack header or DSI. When reproducing data from the aforementioned recording medium, the reproducing apparatus acquires a frame of audio packets, extracts data of a channel to be reproduced, and supplies the data to the audio decoder to perform a decoding process.

FIG. 4A illustrates the relationship between a main word (16 bits) and an extra word (4 bits) in the 20-bit mode, generally showing the aforementioned data arrangement, and FIG. 4B illustrates the relationship (16 bits) and an extra word (8 bits) in the 24-bit mode.

As shown in FIGS. 4A and 4B, sample data has the aforementioned frame structure and pack structure with an integer multiple of twin pairs of samples. Each pair includes a main sample and an extra sample.

The foregoing description has been given on the premise that no interleave process is performed in the signal format. When there is a scratch on the recording medium or consecutive drops of data during data transfer, interleaving can reduce the consecutive signal losses, if it has been performed. It is known that interleaving permits approximate interpolation of lost sample data.

Figure 5:
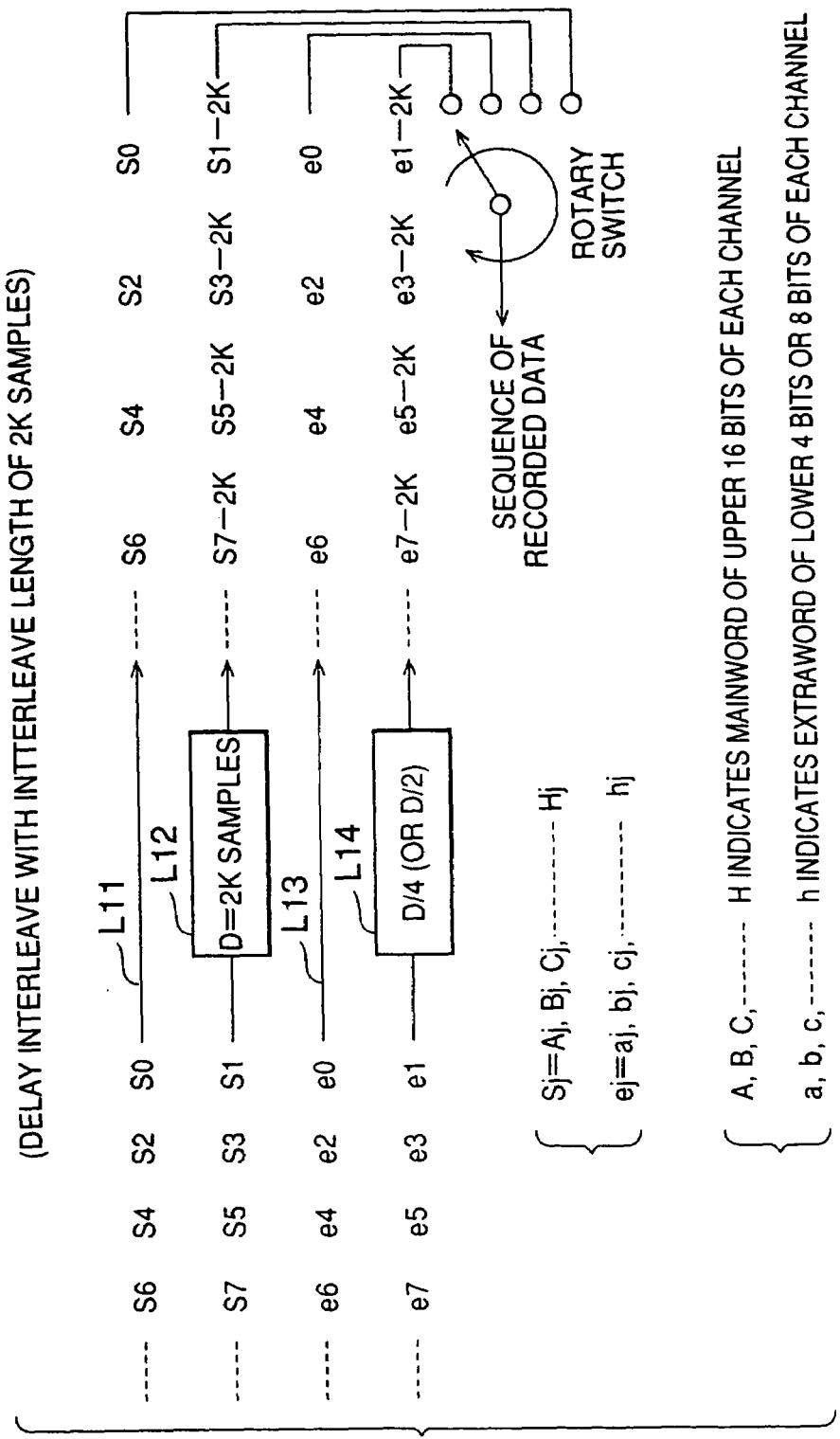
FIG. 5 is an explanatory diagram illustrating the principle of interleaving.

FIG. 5 illustrates the principle of interleaving and deinterleaving for the above-described format. According to the data arrangement of this invention, even when interleaving is executed, a low-cost machine can easily deinterleave only main words. This feature allows the circuit to be simplified.

This example employs a delay interleave technique with an interleave length D of 2k samples. In the figure, S means one main sample, and the main samples are S0=A0, B0, . . . H0; S1=A1, B1, . . . H1; S2=A2, B2, . . . H2; and Sj=Aj, Bj, Cj, . . . Hj. The letter "e" means an extra sample, and extra samples e0=a0, b0, . . . h0, e1=a1, b1, . . . h1; e2=a2, b2, . . . h2; and ej=aj, bj, cj, . . . hj. Even main samples are input to a delayless transmission system L11, and odd main samples are input to a delay transmission system L12. Even extra samples are input to a delayless transmission system L13, and odd extra samples are input to a delay transmission system L14.

The delay amount of extra samples which each consists of 4 bits, can be one fourth the delay amount of main samples (16 bits), and the delay amount of extra samples each consisting of 8 bits, can be half of the delay amount of main samples (16 bits). Therefore, the delay transmission system L14 is designed to be able to switch the delay amount between the 20-bit mode and the 24-bit mode.

Columns of the individual samples on the input side of the transmission systems in FIG. 5 maintain the format which has been discussed with reference to FIG. 1B. With the columns of samples synchronized, the individual samples are input to the associated transmission systems. As a result, a two-dimensional arrangement of samples, as seen on the right-hand side of the individual transmission systems, is acquired. Although the data contents of columns in the two-dimensional array are different from those before interleaving, this array still contains combinations of two main samples and two extra samples in the vertical direction.

In executing the deinterleave process, even columns of main samples are input to a delay transmission path while odd columns of main samples are input to a delayless transmission path. Likewise, even columns of extra samples are input to a delay transmission path while odd columns of extra samples are input to a delayless transmission path. This processing can provide the original sample arrangement. In the 16-bit mode, only the transmission systems for main samples should be used.

On the reproduction side, a machine which reproduces only main samples should have a deinterleave circuit which handles only main samples. To reproduce only a specific channel, a deinterleave circuit which handles words in sample data of that specific channel is used.

As described above, this invention can provide a data arranging method and a medium for recording or transferring multichannel data of the linear PCM system which can allow both low-cost and high-cost machines to perform a reproduction process, and a processing apparatus which processes such data.

Figure 6A:
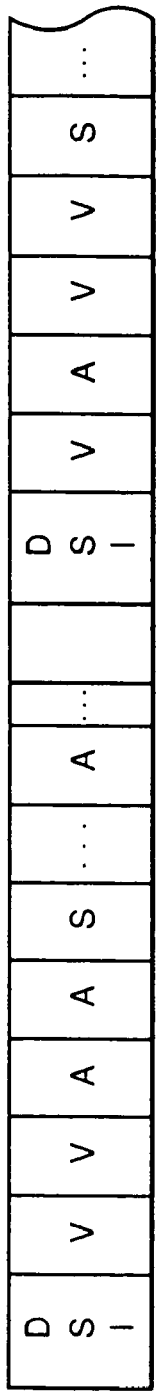
FIGS. 6A and 6B are explanatory diagrams showing an example of the arrangement of packs and the structure of an audio pack in this arrangement according to this invention.

FIG. 6A illustrates the arrangement of packs. Each pack includes a packet.

DSI is data search information, V is a video object, A is an audio object, and S is a sub picture object. Each block is called a pack. The size of one pack is set at 2048 bytes. One pack includes one packet, and consists of a pack header, a packet header and a packet data section. Described in DSI is information for controlling each piece of data during playback, such as the start address and end address of each pack.

Figure 6B:
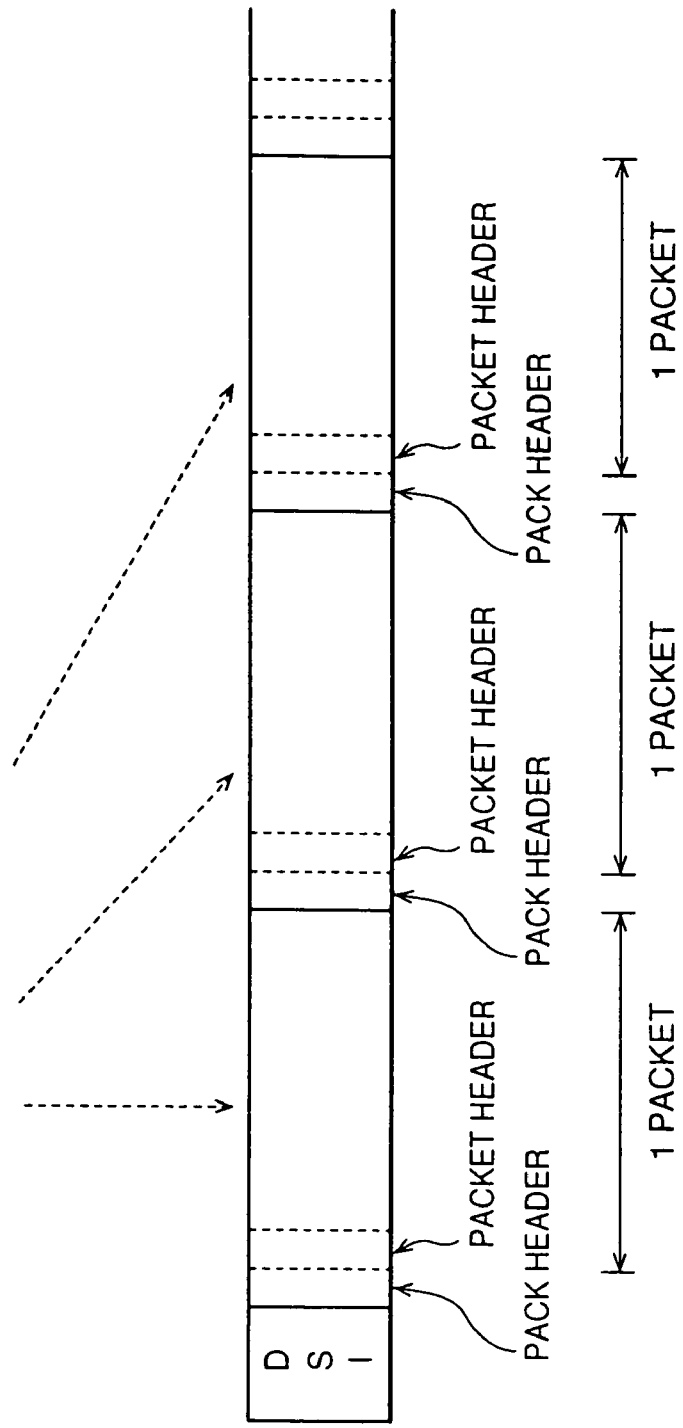

FIG. 6B shows only audio packs A extracted. Although DSI packs, video packs, and audio packs are actually mixed in the arrangement, as shown in FIG. 6A, only audio packs are illustrated in FIG. 6B to help understand packs. The standards of this system define that the amount of information arranged between DSIs should be equivalent to about 0.5 sec when information between DSIs is reproduced. As mentioned above, one pack consists of a pack header, a packet header, and a packet data section.

Described in the pack header and the packet header is information necessary to reproduce audio data, such as the size of an audio pack, presentation time stamp for synchronization with the reproduction output of video data, an identification (ID) code of a channel (stream), quantization bits, a sampling frequency, and start address and end address of data.

Next, audio data inserted in this packet has twin pairs of samples. Each pair has two main samples and two extra samples, as shown in FIGS. 1A–1C.

Figure 7:
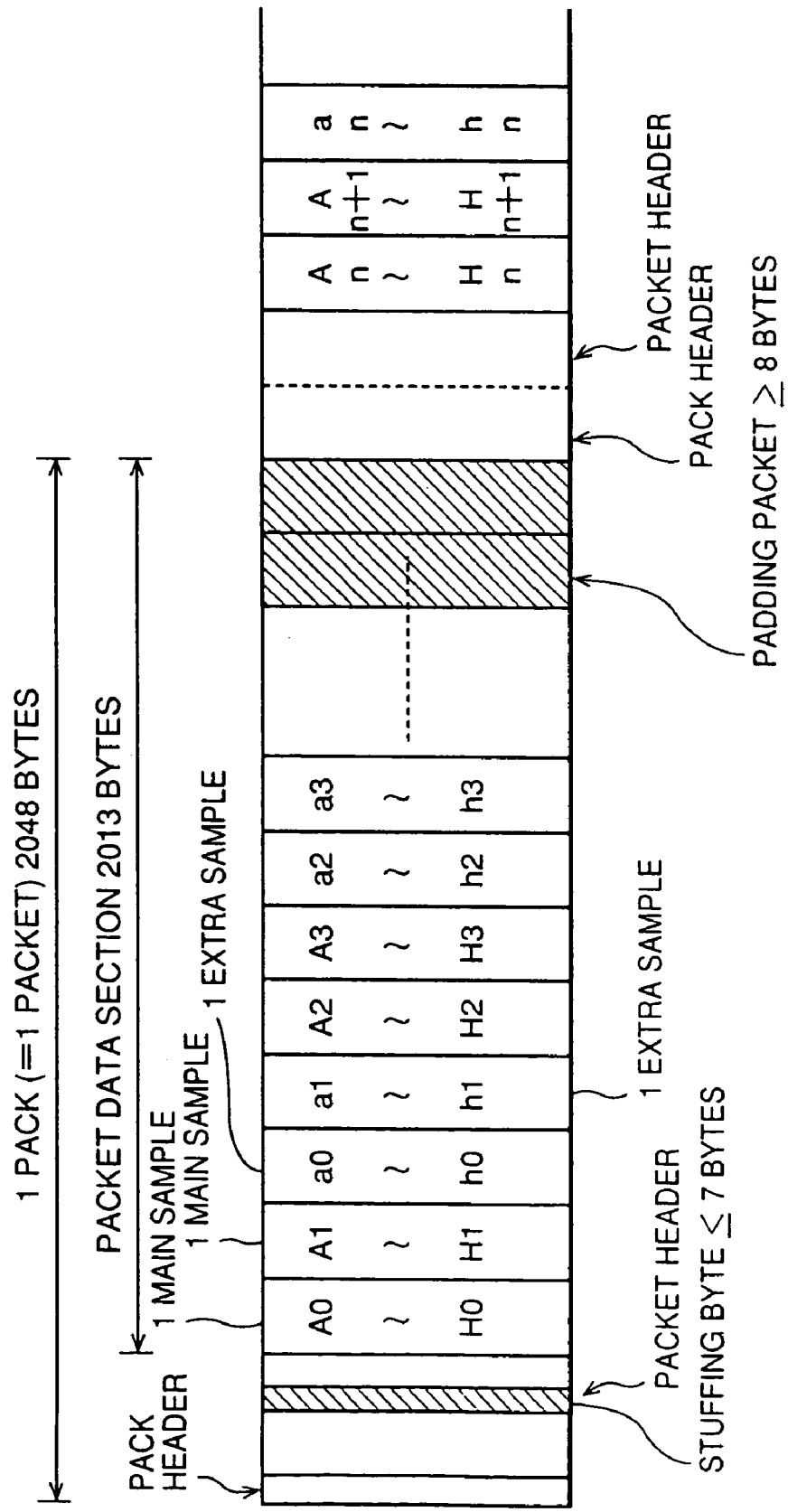
FIG. 7 is an explanatory diagram depicting the detailed structure of an audio pack.

FIG. 7 shows an enlarged audio pack. Arranged in the data section of this audio pack are twin pairs of samples with the top twin pair of samples (A0-H0, A1-H1) located at the top of the data area. The number of bytes in one pack is set at 2048 bytes. As samples are variable length data, 2048 bytes should not necessarily be equal to an integer multiple of the byte length of twin pairs of samples. Therefore, there may be a case where the maximum byte length of one pack differs from the byte length of a twin pair of samples×integer number. In this case, the byte length of a pack is greater than or equal to a twin pair of samples×integer number. If a part of a pack remains, a stuffing byte is inserted in the pack header, when the remainder is equal to or less than 7 bytes, or a padding packet is inserted at the end of the pack, when the remainder exceeds 7 bytes.

Audio information in this pack format can easily be handled at the time of reproduction.

Since the top audio data in each pack is the top twin pair of samples or main samples, the reproduction process becomes easier when reproduction is executed with the proper timing. This is because the reproduction apparatus acquires data and performs data processing pack by pack. If samples of audio data are located over two packs, the two packs should be acquired and the audio data should be decoded after integration. This complicates the processing. When the top audio data in each pack is always the top twin pair of samples and audio data is grouped pack by pack as in this invention, timing should be taken only for one pack, thus facilitating the data processing. Further, the packet-by-packet data processing simplifies the authoring system (aiding system), which can simplify software for processing data.

At the time of special reproduction or the like, video data may be subjected to thinning or interpolation. In such a case, since audio data is permitted to be handled packet by packet, it is possible to relatively easily control the reproduction timing. Further, software for the decoders need not be complicated.

Although samples are generated with each sample separated into the upper 16 bits and the lower 4 bits in the above-described system, data should not necessarily take such a format as long as linear audio data is sampled.

With the data length of an extra sample set to 0, for example, a train of data becomes a sequence of main samples which is the general data format. In this case, no extra samples are present, so there is no need to generate twin pairs of samples and main samples alone are formed into packets.

FIG. 8 shows a list of the sizes of linear PCM data when linear PCM data are arranged in a packet in units of twin pairs of samples as discussed above. The data sizes are shown as the number of maximum samples to be fit in one pack, separately for the monaural (mono), stereo, and multichannel modes. Each group shows the data sizes for the respective numbers of quantization bits. Because twin pairs of samples are taken as units, every number of samples in one packet is an even number. As the number of channels increases, the number of bytes increases accordingly, so that the number of samples in one packet decreases. When number of quantization bits is 16 bits and the mode is the monaural mode, the number of samples in one packet is 1004, and a number of bytes is 2008 with a stuffing byte of 5 bytes, which indicates that there are no padding bytes. Note however, that the first packet has the stuffing bytes of 2 bytes. This is because 3-byte attribute information may be affixed to the header of the first packet.

With the number of quantization bits being 24 bits and in the stereo mode, stuffing 6 bytes is given to the top packet and padding 9 bytes is given to the subsequent packets.

Figure 9:
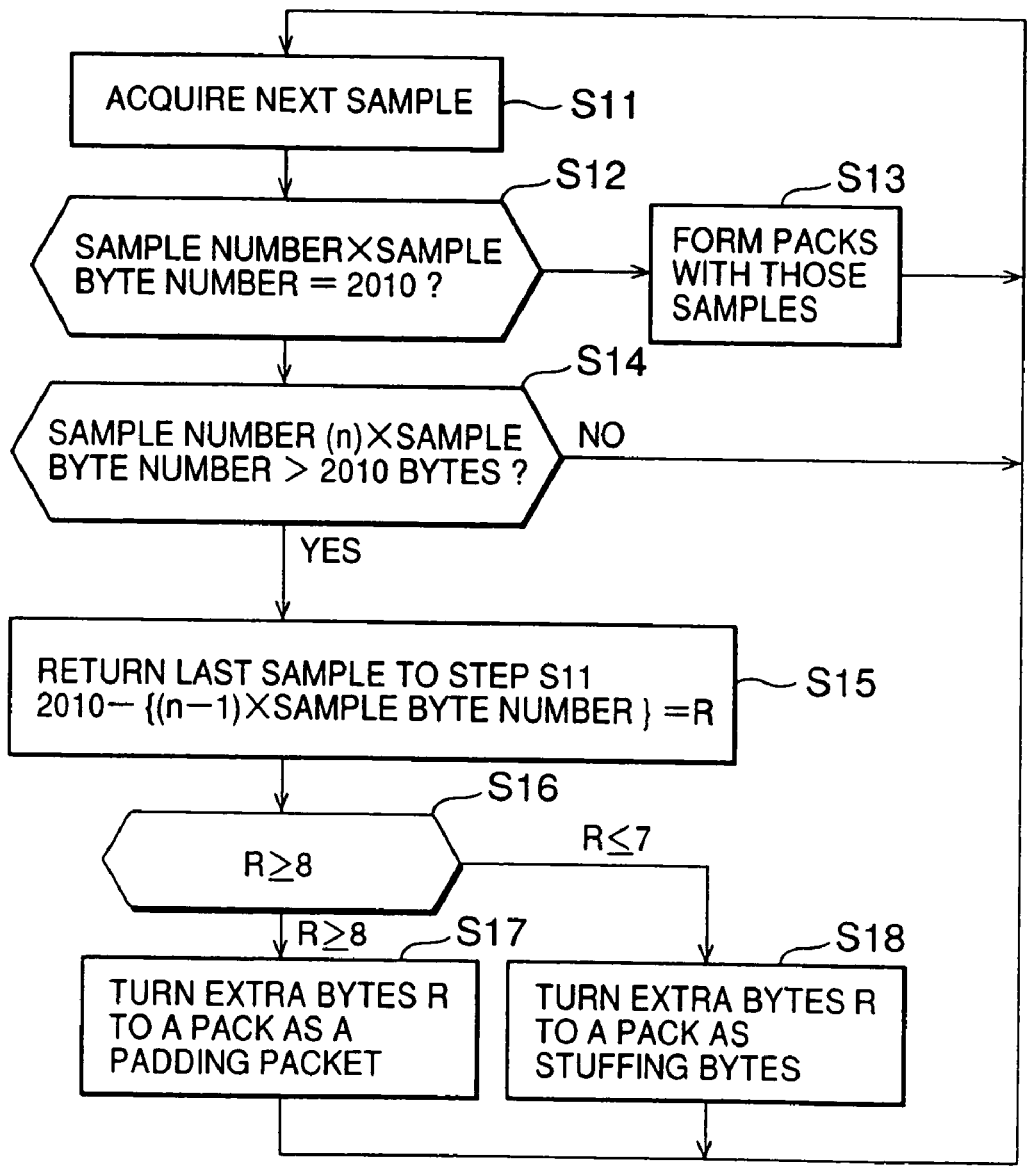
FIG. 9 is an explanatory diagram illustrating procedures of generating an audio pack.

FIG. 9 illustrates the operational procedures of the apparatus which generates packs.

Suppose that audio signals of each channel are samples to produce the samples as shown in FIG. 1B, which are stored in the memory. In step S11, samples are acquired one by one. In step S12, it is determined if the number of bytes has reached the capacity of a packet (2010 bytes). When 2010 bytes are reached, those samples up to that sample are packed (step S13).

When the number of bytes has not reached the capacity of a packet (2010 bytes), the flow proceeds to step 514 where it is determined if the number of bytes of the acquired samples exceeds 2010 bytes. When it does not exceed 2010 bytes, the flow returns to step S11. When it exceeds 2010 bytes, on the other hand, the last acquired sample is returned to the position of step S11 and the difference between the number of remaining bytes and 2010 bytes is computed in step S15. It is then determined if this difference R exceeds 8 bytes (step S16). When the difference R exceeds 8 bytes, padding is performed (step S17) to construct a packet, whereas when the difference R is equal to less than 7 bytes, stuffing is performed (step S18) to construct a packet.

The reproduction apparatus which reproduces the above-discussed data will be briefly described.

Figure 10:
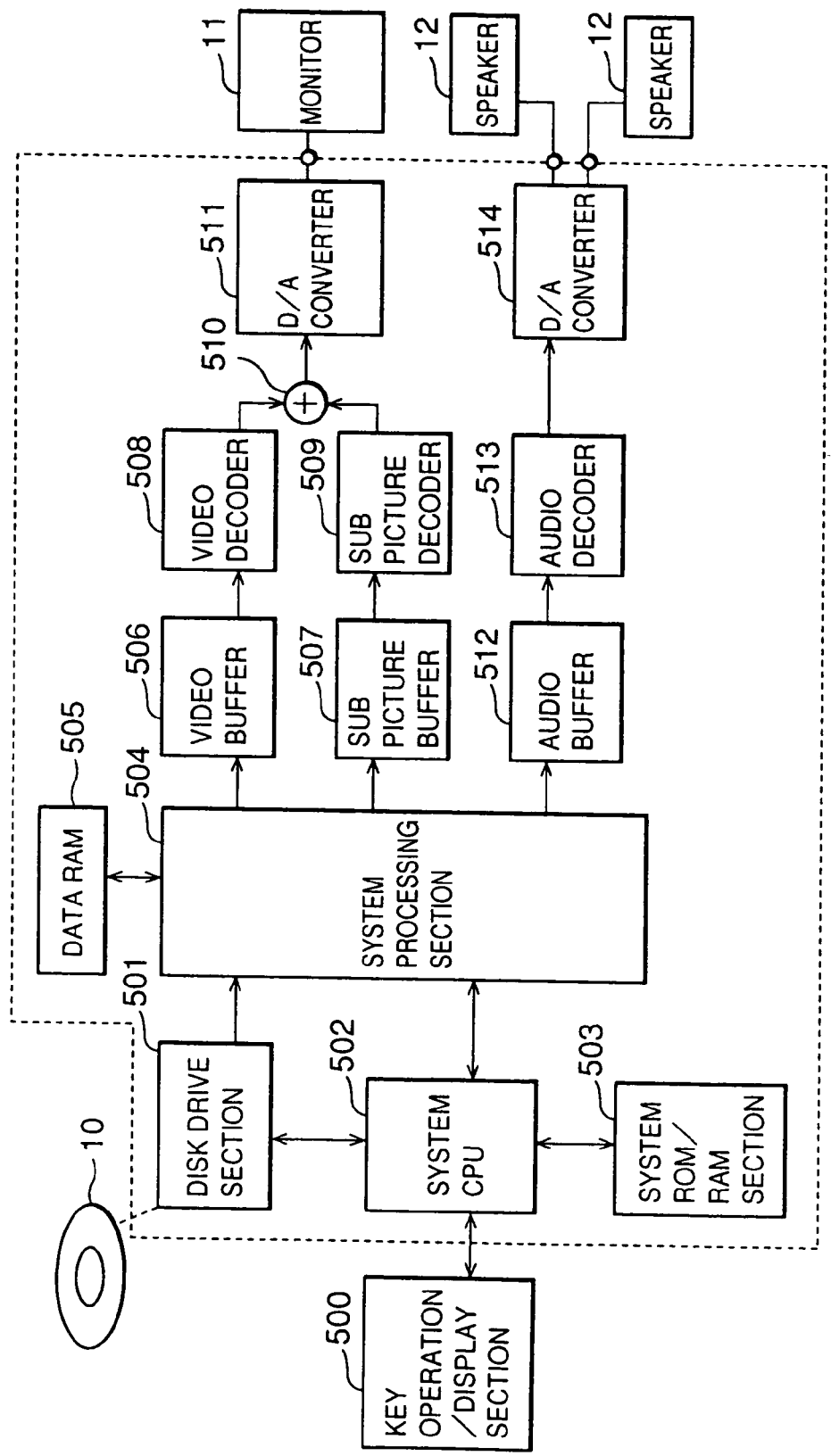
FIG. 10 is a block structural diagram of a disk playing apparatus.
Figure 11:
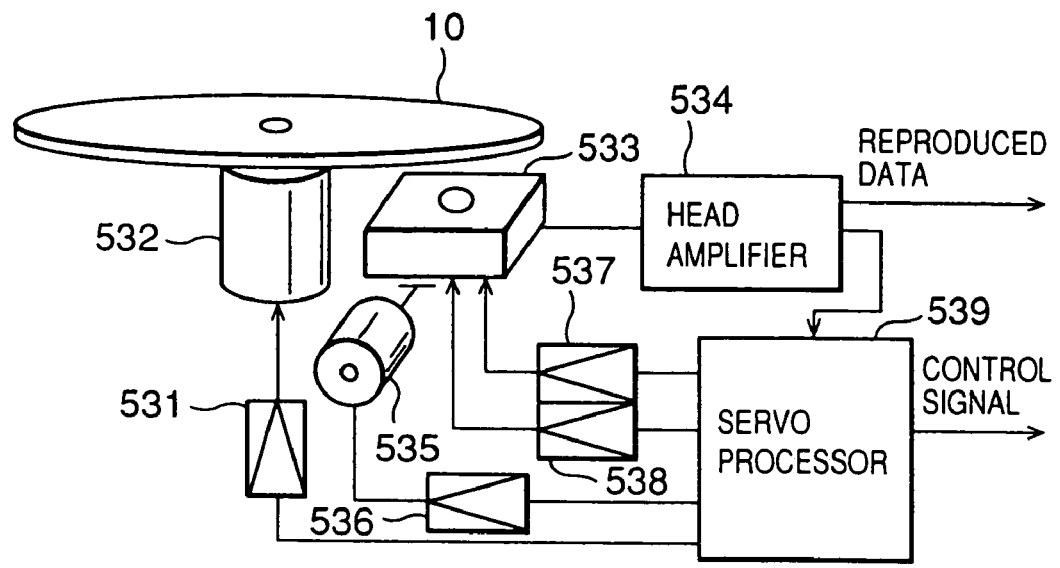
FIG. 11 is an explanatory diagram of a disk drive section.
Figure 12:
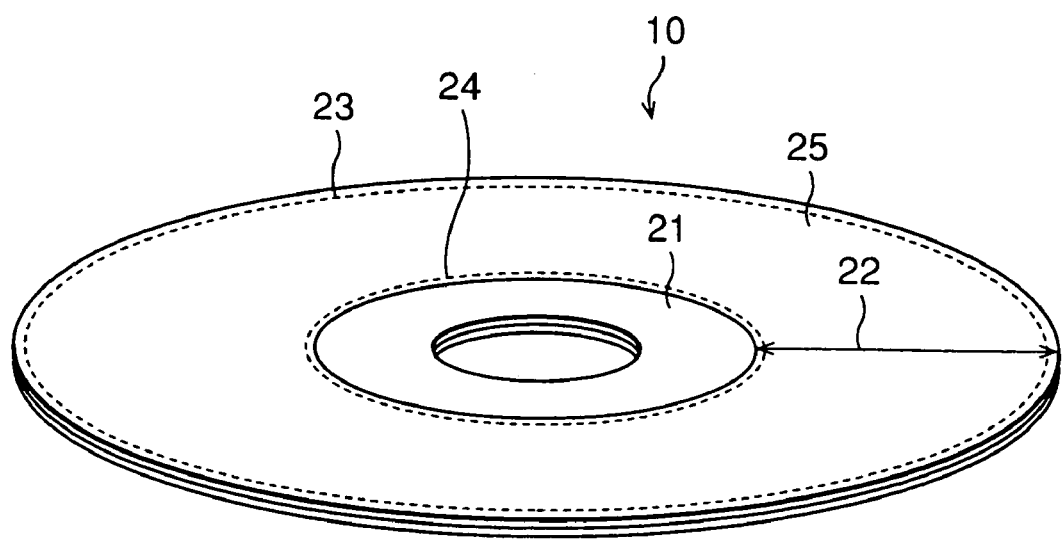
FIG. 12 is an explanatory diagram of an optical disk.

FIG. 10 shows an optical disk player. FIG. 11 shows the basic structure of a disk drive section 501 which drives an optical disk 10 on which the above-described audio stream is recorded. FIG. 12 presents a diagram for explaining an example of the structure of the optical disk 10.

The optical disk player in FIG. 10 will now be discussed.

The optical disk player has a key operation/display section 500. The optical disk player is connected to a monitor 11 and speakers 12. Data picked up from the optical disk 10 is sent via the disk drive section 501 to a system processing section 504. The picked-up data from the optical disk 10 includes picture data, sub picture data, and audio data, for example, which are separated in the system processing section 504. The separated picture data is supplied via a video buffer 506 to a video decoder 508, the sub picture data is supplied via a sub picture buffer 507 to a sub picture decoder 509, and the audio data is supplied via an audio buffer 507 to an audio decoder 513. The picture signal decoded by the video decoder 508 and the sub picture signal decoded by the sub picture decoder 509 are combined by a synthesizing section 510, and the resultant signal is converted to an analog picture signal by a D/A converter 511. This analog picture signal is then sent to the monitor 11. The audio signal decoded by the audio decoder 513 is converted by a D/A converter 514 to an analog audio signal which is in turn supplied to the speakers 12.

The entire player is controlled by a system CPU 502. That is, the system CPU 502 can exchange control signals, timing signals, and the like, with the disk drive section 501, the system processing section 504, and the key operation/display section 500. Connected to system CPU 502 is a system ROM/RAM 503 in which fixed programs for allowing the system CPU 502 to execute data processing are stored. Management data or the like, which is reproduced from the optical disk 10, can also be stored in the system ROM/RAM 503.

A data RAM 505, connected to the system processing section 504, is used as a buffer when the aforementioned data separation, error correction, or the like, is executed.

The disk drive section 501 in FIG. 11 will now be discussed.

A disk motor driver 531 drives a spindle motor 532. As the spindle motor 532 rotates, the optical disk 10 turns and data recorded on the optical disk 10 can be picked up by an optical head section 533. The signal picked up by the optical head section 533 is sent to a head amplifier 534 whose output is input to the system processing section 504.

A feed motor 535 is driven by a feed motor driver 536. The feed motor 535 drives the optical head section 533 in the radial direction of the optical disk 10. The optical head section 533 is provided with a focus mechanism and a tracking mechanism to which drive signals from a focus circuit 537 and a tracking circuit 538 are, respectively, supplied.

Control signals are input to the disk motor driver 531, the feed motor driver 536, the focus circuit 537, and the tracking circuit 538 from a servo processor 539. Accordingly, the disk motor 532 controls the rotation of the optical disk 10 in such a way that the frequency of the picked-up signal becomes a predetermined frequency, the focus circuit 537 controls the focus mechanism of the optical system in such a way that the optical beam from the optical head section 533 forms the optimal focal point on the optical disk 10, and the tracking circuit 538 controls the tracking mechanism in such a way that the optical beam hits the center of the desired recording track.

The structure of the optical disk 10 shown in FIG. 12 will now be explained.

The optical disk 10 has information recording areas 22 around clamp areas 21 on both sides. The information recording area 22 has a lead-out area 23 where no information is recorded at the outer periphery, and a lead-in area 24 where no information is recorded at the boundary with the associated clamp area 21. Between the lead-out area 23 and the lead-in area 24 lies a data recording area 25.

Tracks are continuously formed in the data recording area 25 in a spiral form. The tracks are separated into a plurality of physical sectors which are given serial numbers. Signal spots on tracks are formed as pits. For a read-only optical disk, a sequence of pits is formed on a transparent substrate by a stamper, and a reflection film is on the pitted surface to form a recording layer. A double-disk type optical disk has two disks adhered together via an adhesive layer, yielding a composite disk, in such a manner that the recording layers face each other.

The logical format of the optical disk 10 will now be discussed.

Figure 13:
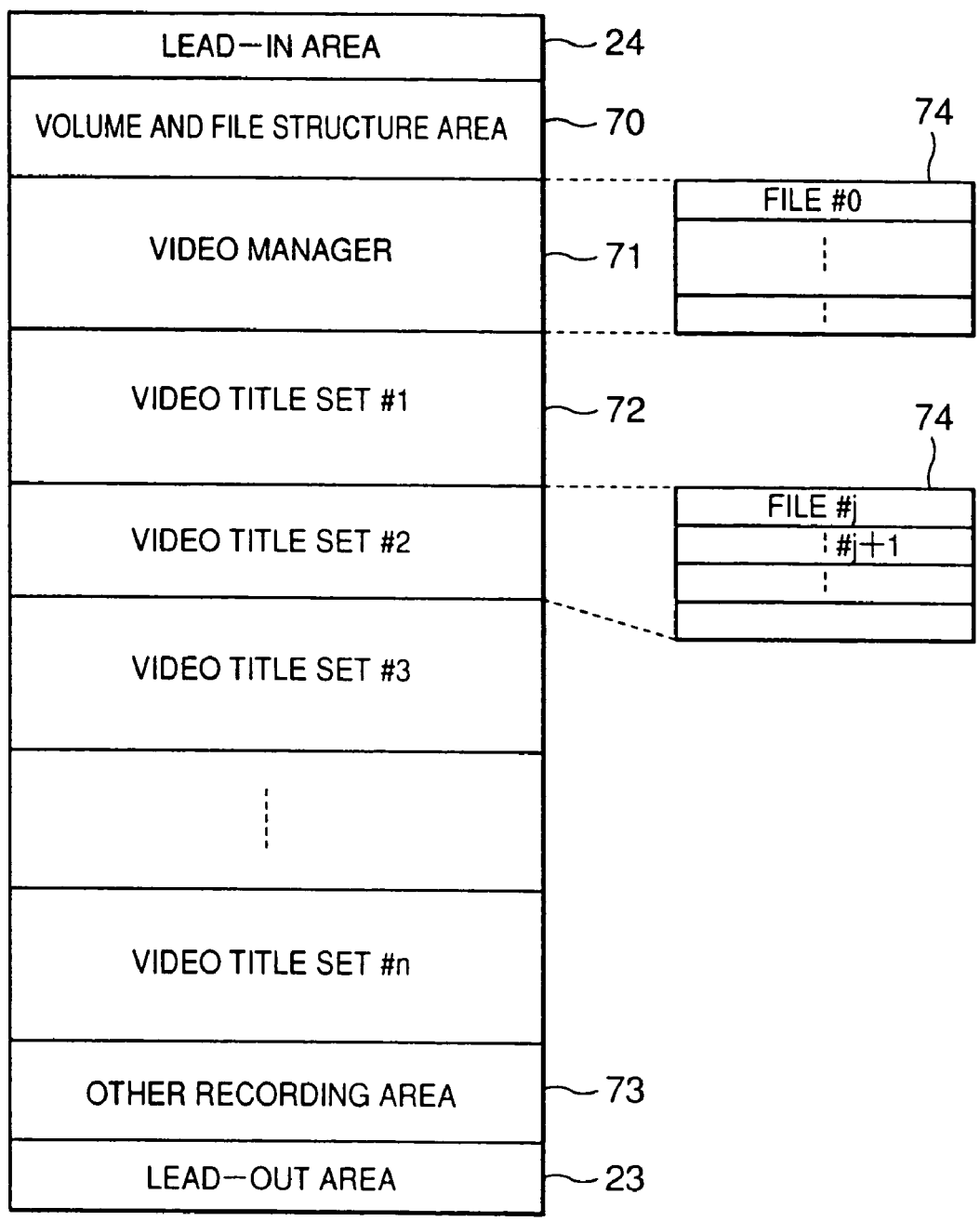
FIG. 13 is an explanatory diagram illustrating the logical format of an optical disk.

FIG. 13 shows the logical format of the information sections of the information recording area 25. This logical format is determined in conformity to specific standards, such as micro UDF and ISO 9660. In the following description a logical address means a logical sector number (LSN) which is determined by the micro UDF and ISO 9660, and logical sectors are the same size as the aforementioned physical sectors. Each logical sector has 2048 bytes. It is assumed that serial logical sector numbers (LSN) are given to the logical sectors in the ascending order of the physical sector numbers.

The logical format is a hierarchical structure and has a volume and file structure area 70, a video manager 71, at least one video title set 72, and another recording area 73. Those areas are differentiated at the boundaries of the logical sectors. As mentioned above, the size of one logical sector is 2048 bytes. The size of one logic block is also 2048 bytes, so that one logical sector is defined as one logic block.

The file structure area 70 is equivalent to a management area which is defined by the micro UDF and ISO 9660, and data in the video manager 71 is stored in the system ROM/RAM section 52 via the description in this area 70. Information for managing the video title sets is described in the video manager 71, which consists of a plurality of files 74 starting with a file #0. Recorded in each video title set 72 are compressed video data, sub picture data, audio data, and playback control information for reproducing those data. Each video title set 72 consists of a plurality of files 74, which are also differentiated at the boundaries of the logical sectors.

Recorded in the other recording area 73 is information which is used when the information in the video title set is used or information which is exclusively used.

Figure 14:
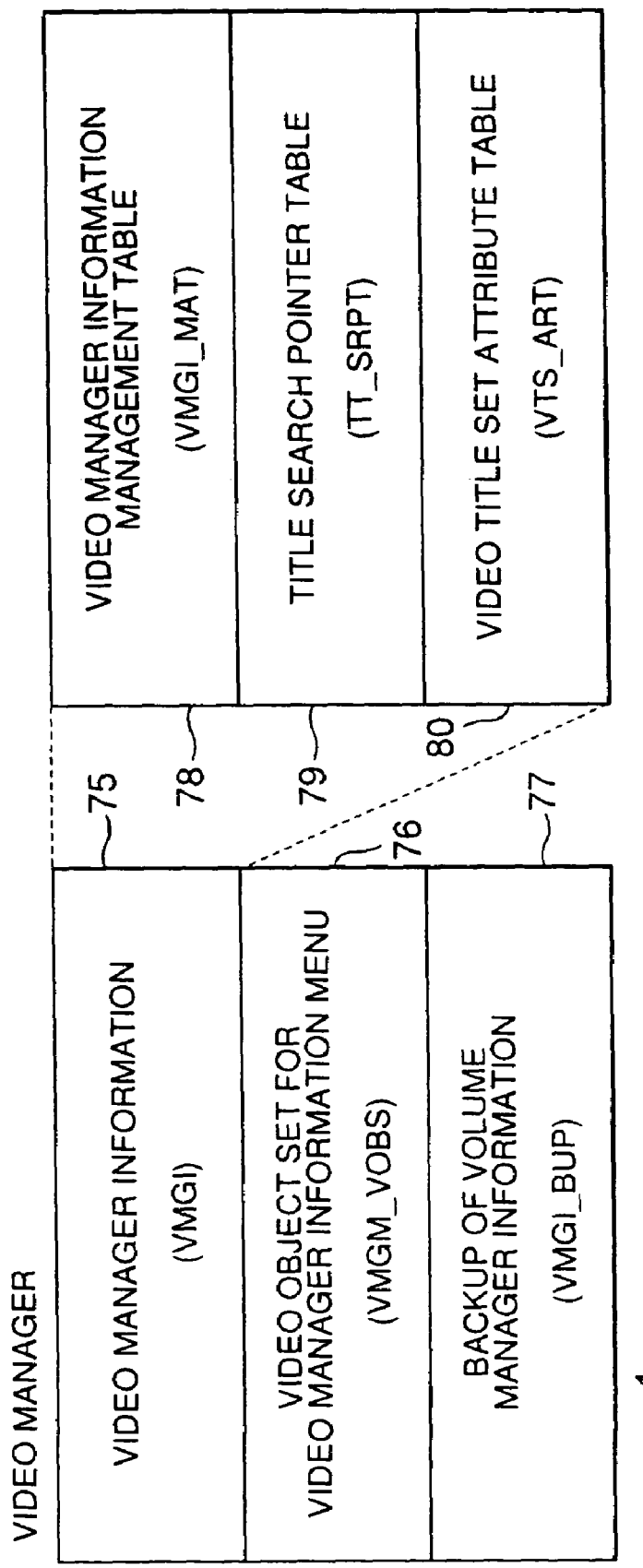
FIG. 14 is an explanatory diagram of a video manager in FIG. 13.

The video manager 71 will be described below with reference to FIG. 14.

The video manager 71 consists of video manager information (VMGI) 75, a video object set for a video manager information menu (VMGM_VOBS) 76 and a backup of video manager information (VMGI_BUP) 77.

Stored in the VMGM_VOBS 76 are video data, audio data, and sub picture data, for the menu which is associated with the volume of the optical disk. The VMGM_VOBS 76 can provide descriptive information, given by voices and a sub picture in association with each of titles in the volume, and the selection display for the titles. When English conversations for learning English are recorded on the optical disk, for example, the title name of each English conversation and examples of a lesson are reproduced and displayed while a theme song is acoustically reproduced, and each sub picture shows which text of which level or the like. The lesson numbers (levels) are displayed as selection items which should be selected by a listener. The VMGM_VOBS 76 is used for such a usage.

Figure 15:
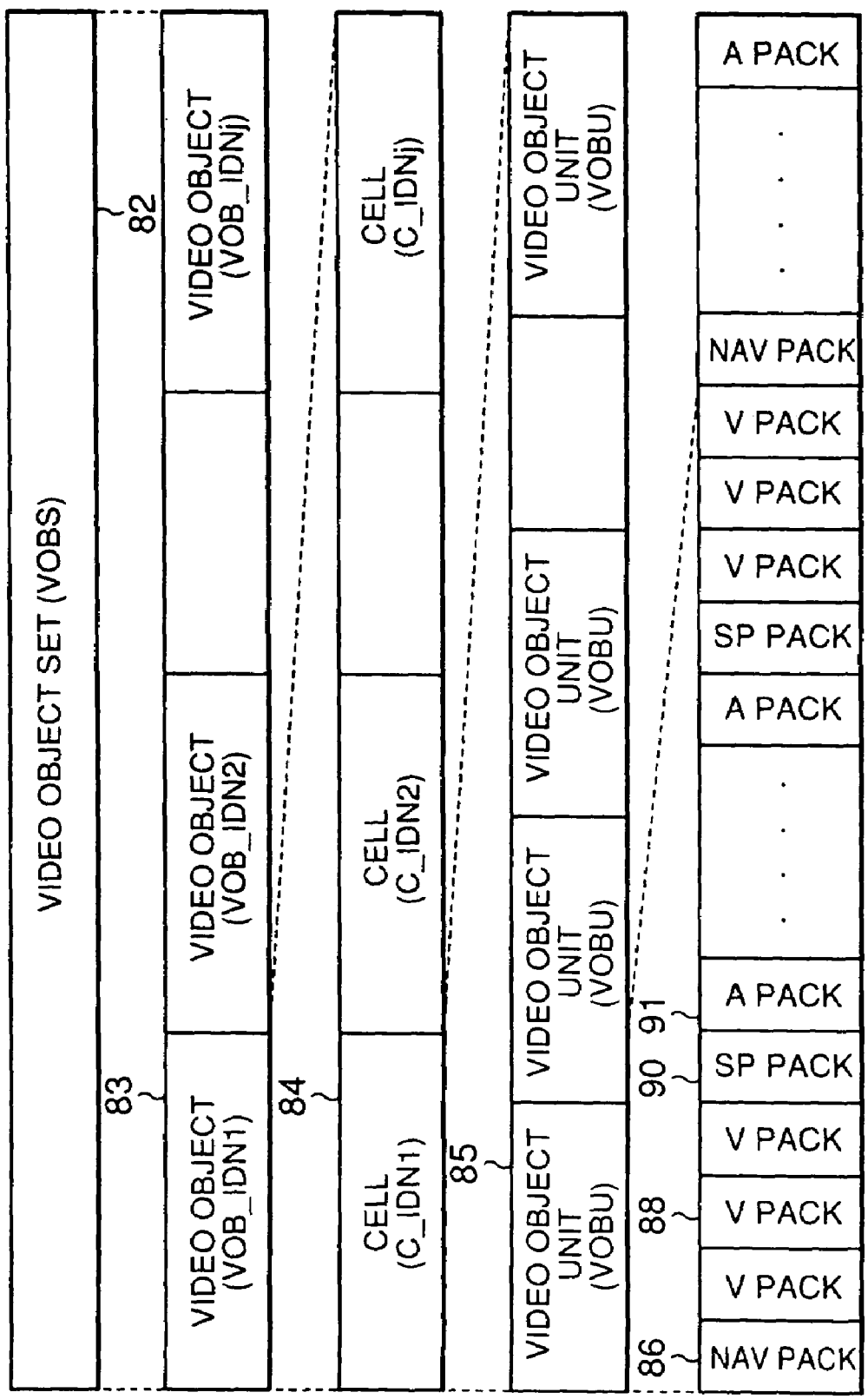
FIG. 15 is an explanatory diagram of a video object set in FIG. 14.

FIG. 15 illustrates a video object set (VOBS) 82.

There are two types of video object sets for a menu and one type of video object set for video titles. The three types of video object sets have similar structures.

The VOBS 82 is defined as a set of one or more video objects (VOB's) 83, which are used for the same purpose. Normally, the VOBS for a menu consists of video objects (VOB's) for displaying a plurality of menu screens, while the VOBS for a video title set consists of VOB's for displaying normal moving pictures or the like.

Each VOB is given an ID number (VOB_IDN#j), which is used to identify that VOB. One VOB consists of one cell or a plurality of cells 84. Likewise, each cell is given an ID number (C_IDN#j), which is used to identify that cell. The video object for a menu may be comprised of a single cell.

Further, one cell consists of one or a plurality of video object units (VOBU's). A single VOBU is defined as a sequence of packs having a navigation pack (NAV pack) 86 at the top. One VOBU is defined as a set of all packs recorded between the NAV pack 86 (including the aforementioned DSI) and the next NAV pack 86.

The playback time for the VOBU is equivalent to the playback time for video data which consists of a single GOP (Group Of Pictures) or a plurality of GOP's included in this VOBU, and is defined to be equal to or greater than approximately 0.4 sec and equal to or less than 1 sec. The MPEG standards define one GOP as compressed image data equivalent to the playback time of about 0.5 sec. According to the MPEG standards, therefore, about 0.5 sec of audio information and picture information can be arranged.

One VOBU has the aforementioned NAV pack 86 at the top, followed by video packs (V packs) 88, sub picture packs (SP packs) 90 and audio packs (A packs) 91 arranged in a certain order. A plurality of V packs 88 in one VOBU 85 has compressed image data whose playback time is equal to or less than 1 sec, in the form of one GOP or a plurality of GOP's. Audio signals corresponding to this playback time are compressed and arranged as A packs 91. The sub picture data used within this playback time is compressed and is arranged as SP packs 90. It is to be noted that audio signals are recorded with, for example, eight streams of data as a pack, and sub pictures are recorded with, as a pack, for example, thirty-two streams of data.

One stream of audio signals is data encoded by one kind of coding system, and consists of eight channels of linear PCM quantized data of 20 bits, for example.

Returning to FIG. 14, the VMGI 75 describes information for searching for a video title, and includes at least three tables 78, 79 and 80.

A video manager information management table (VMGI_MAT) 78 describes the size of the VMG 71, the start address of each information in the video manager, attribute information associated with the video object set for a video manager menu (VMGM_VOBS), and the like.

A title search pointer table (TT_SRPT) 79 describes entry program chains (EPGC) of the video titles included in the volume of the optical disk which are selectable in accordance with the title number input through the key operation/display section of the apparatus.

Figure 16:
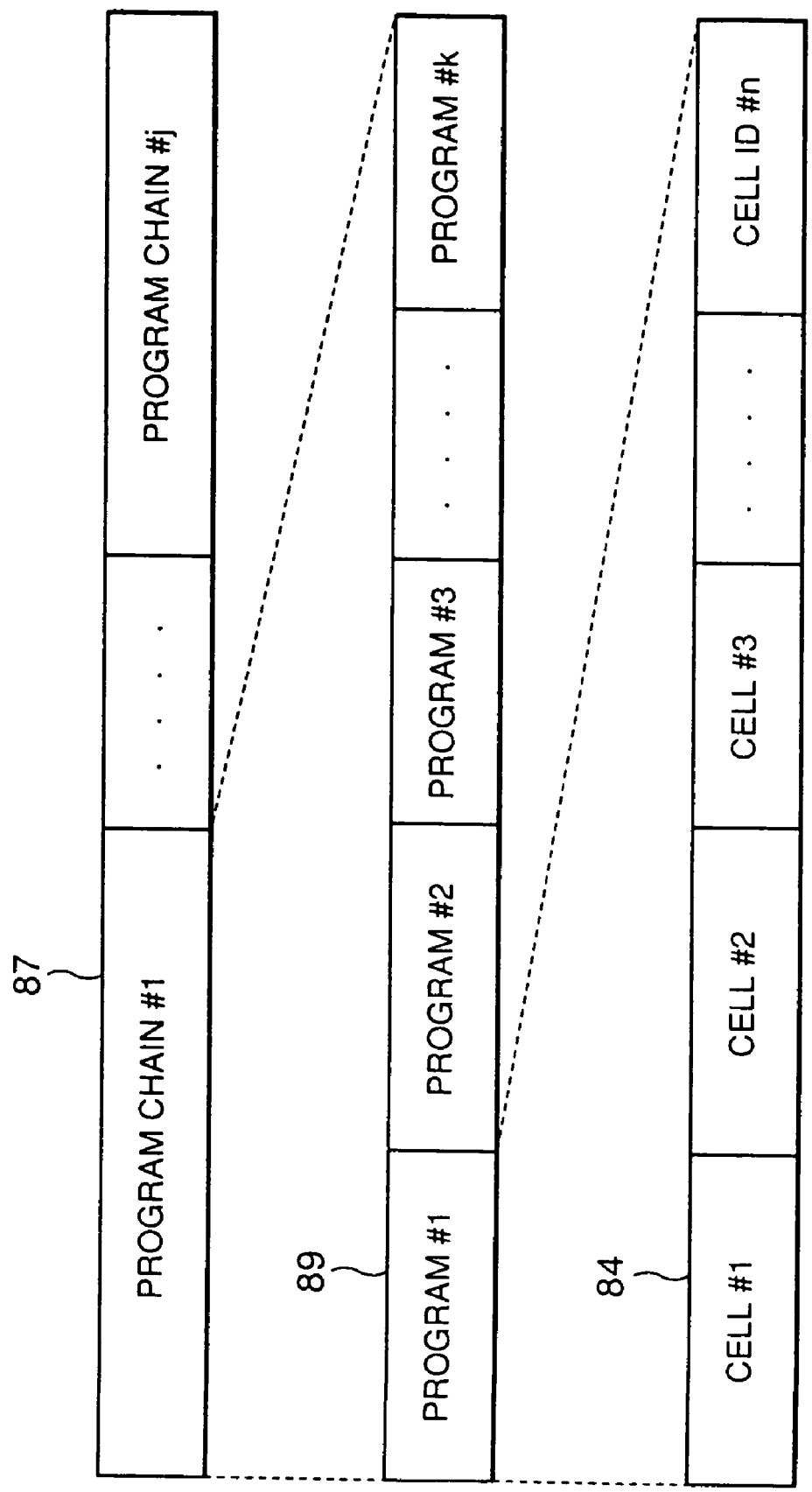
FIG. 16 is an explanatory diagram of a program chain.

The program chains will now be discussed with reference to FIG. 16. Each program chain 87 is a set of program numbers for reproducing the story of a certain title. A chapter of the story of one title or the story itself is completed as program chains are continuously reproduced. One program number consists of a plurality of cell ID numbers each of which can specify a cell in the VOBS.

A video title set attribute table (VTS_ART) 80 describes attribute information which is determined by video title sets (VTS) in the volume of the optical disk. The attribute information includes the number of VTS, the number, the video compression system, the audio coding mode, and the display type of sub pictures.

According to the packet system according to this invention, as described above, audio data at the top of each packet is always at the top of sample data, and packets can be treated as units, so that the timing processing for processing audio data and a sequence of processes of this timing processing becomes easier.

A description will now be given of the audio decoder which reproduces data that is arranged and recorded in the above-described form.

Figure 17:
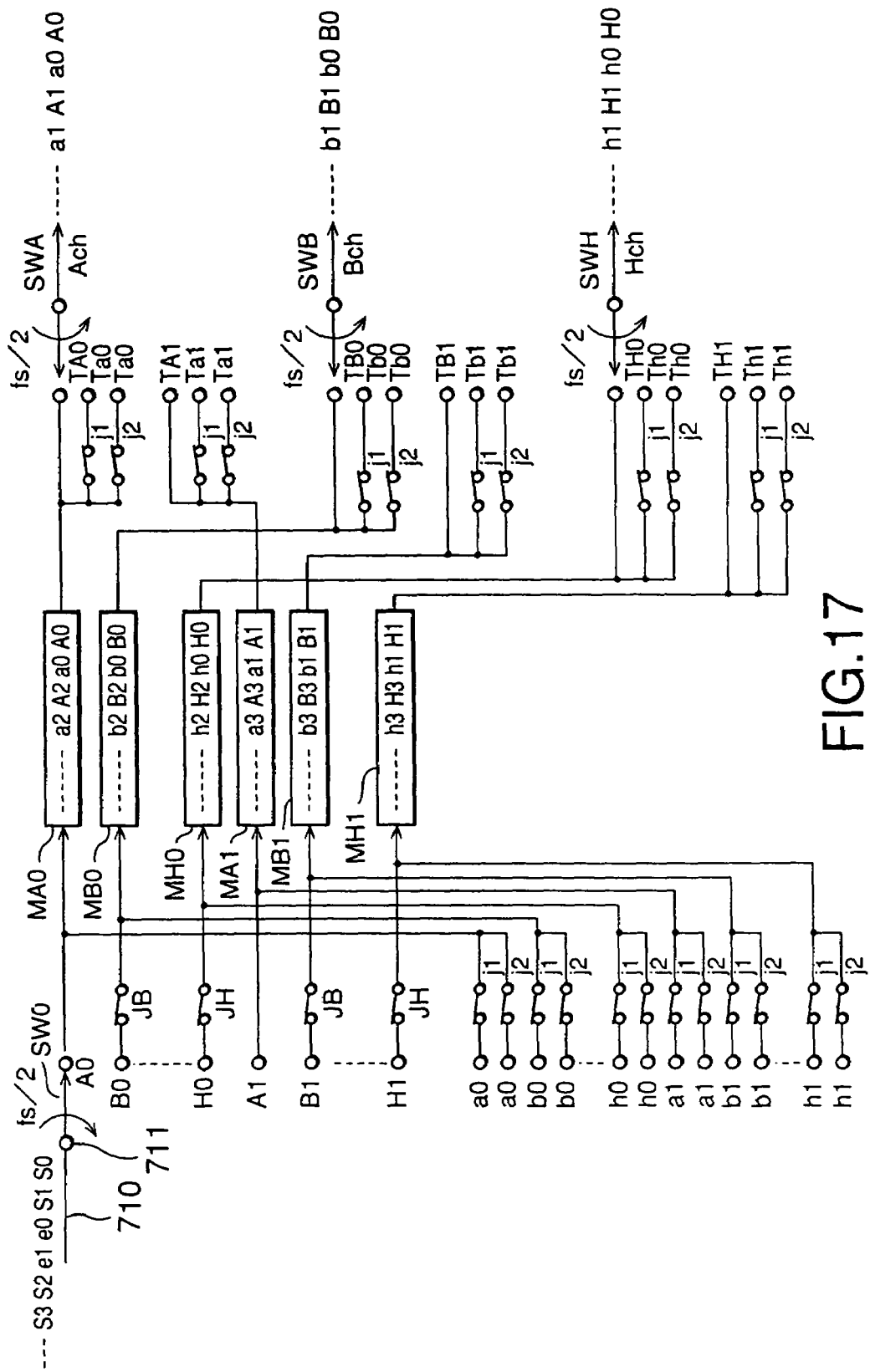
FIG. 17 is a diagram showing one example of the basic circuit structure of an audio decoder according to this invention.

FIG. 17 shows the basic structure of the audio decoder 513.

The illustrated decoder can reproduce data in all the modes for the numbers of channels and the numbers of bits of samples, as shown in FIG. 8. Input data is such that the number of quantization bits of every one of eight channels is 24 bits.

A sequence of samples as discussed with reference to FIG. 1 is continuously input to an input terminal 710. This sequence of samples is given to the input terminal, 711, of a switch SW0. The switch SW0 has distribution terminals for the individual samples of channels An to Hn and an to hn. The terminals which are associated with samples of the individual channels are given the same reference numerals as representative samples. The representative samples are samples A0 to H0, A1 to H1, a0 to h0, and a1 to h1.

It is assumed that the terminals A0 to H0 and A1 to H1 are 16-bit terminals, and the terminals a0 to h0 and a1 to h1 are 4-bit terminals. The extra sample may consist a total of eight bits so that two sets of 4-bit terminals, a0 to h0 and a1 to h1, are prepared. The 16-bit terminal A0 is connected to the upper bits (16 bits) of a memory MA0, and the associated 4-bit terminals a0 and a0 are connected to the lower bits (8 bits) of the memory MA0 via respective switches j1 and j2. The 16-bit terminal B0 is connected via a switch JB to the upper bits of a memory MB0, and the associated 4-bit terminals b0 and b0 are connected to lower bits of the memory MB0 via respective switches j1 and j2. The 16-bit terminal C0 is connected via a switch JC to the upper bits of a memory MC0, and the associated 4-bit terminals c0 and c0 are connected to the lower bits of the memory MC0 via respective switches j1 and j2. Likewise, the other terminals D0 to H0, D1 to H1, d0 to h0, and d1 to h1 are connected to associated memories MD0 to MH1.

As a result, the individual channels are distributed to the memories MA0 to MH1. The output terminals of the memories MA0 and MA1 are connected to terminals TA0, Ta0, Ta0, TA1, Ta1, and Ta1 of an A channel output switch SWA. TA0 and TA1 are 16-bit terminals, and Ta0, Ta0, Ta1, and TA1 are 4-bit terminals. Likewise, the output terminals of the memories MB0 and MB1 are connected to terminals TB0, Tb0, Tb0, TB1, Tb1, and Tb1 of a B channel output switch SWB. TB0 and TB1 are 16-bit terminals, and Tb0, Tb0, Tb1 and Tb1, are 4-bit terminals. The output terminals of the other memories are likewise connected to the associated output switches.

The operation of the audio decoder 513 will now be discussed.

Samples S0, S1, e0, e1, . . . , which are arranged for recording/transfer and are to be input to the switch SW0, can be expressed as A0, B0, . . . , H0, A1, B1, . . . , H1, a0, b0, . . . , h0, a1, b1, . . . h0 as samples of the individual channels. Each of the main words of each channel consists of 16 bits, and each extra word consists of 8 bits. Suppose that the switches of the circuit are all closed. As the rotary switch SW0 is sequentially switched from the topmost contact, associated samples are transferred to the memories MA0 to MH1. In this manner, twin pairs of samples are cyclically stored in the memories MA0 to MH1 by the action of the rotary switch SW0. Thereafter, samples of the desired channel among those samples stored in the memories MA0 to MH1 are read via the associated rotary switch. The main sample and the extra sample in each read sample are decoded and then combined for the subsequent processing.

Let us pay attention to the reading of the channel A. With the rotary switch SWA at the topmost 16-bit contact position, the 16-bit sample A0 is read. Then, samples a0 having a total of 8 bits are read at two 4-bit contact positions. At the next 16-bit contact position, the 16-bit sample A1 is read. Then, samples a1 having a total of 8 bits are read at two 4-bit contact positions. As the rotary switch SWA rotates once, twin pairs of samples A0, a0 and A1, a1 of the channel A are read out. In this manner, twin pairs of samples of the channel A are obtained in a time sequential form. Thereafter, with regard to the other channels B, C and so forth, samples are likewise read. Because twin pairs of samples are processed as each of the rotary switches SW0, SWA, . . . , and SWH makes one turn, the rotational period should be a half of the sampling frequency (fs/2).

Figure 18:
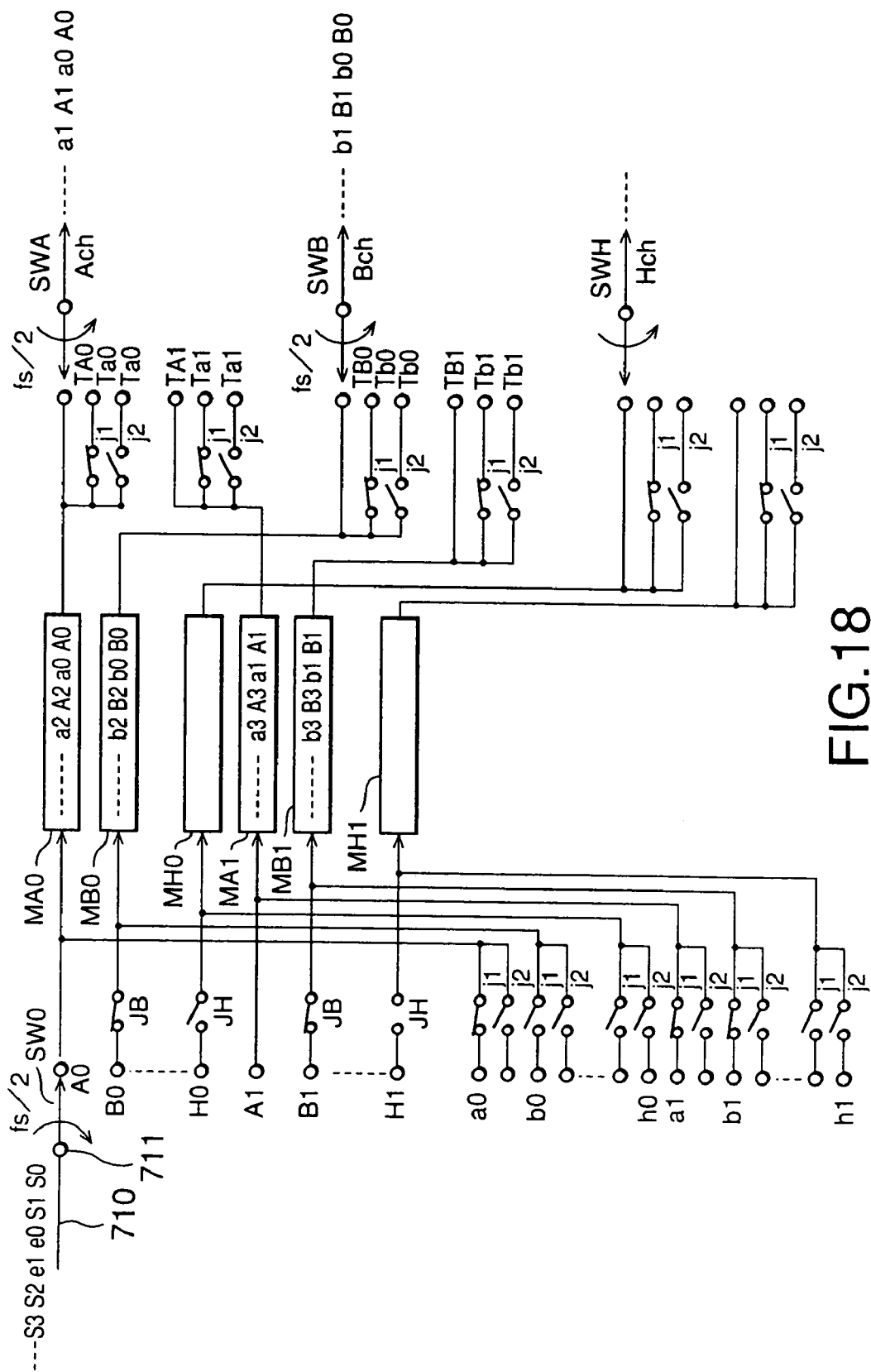
FIG. 18 is a diagram showing a second example of the basic circuit structure of the audio decoder.

FIG. 18 illustrates another embodiment of the audio decoder.

The illustrated embodiment processes data in the case where there are two channels and the number of quantization bits of each sample is 20 bits. This circuit differs from the one shown in FIG. 17 in the statuses of the switches JB-JH, j1 and j2. Therefore, same reference numerals are given to those components which are the same as the corresponding components of the circuit in FIG. 17.

Samples S0, S1, e0, e1, and so forth are expressed as A0, B0, A1, B1, a0, b0, a1, b1, and so forth, as a sequence of samples of the individual channels. Each main sample of each channel consists of 16 bits, and each extra sample consists of 8 bits.

As illustrated, only the switch JB is closed, and the switches JC to JH are open. With regard to those switches j1 and j2 which are associated with the extra samples a0, b0, a1 and b1, as illustrated, only the switches j1 are closed and the other switches are open. Those switches j1 and j2 which are associated with the other extra samples c0, . . . ,h0, c1, . . . , h1 are all open.

When the rotary switch SW0 distributes input data in synchronism with the data input, data to be transferred are A0, B0, A1, B1, a0 (4 bits), b0 (4 bits), a1 (4 bits) and b1 (4 bits). The action of the rotary switch SW0 allows the samples to be input to only the memories MA0, MB0, MA1 and MB1 in the illustrated order.

On the output side, outputs are obtained from those of the memories MA0 to MH1 which are associated with the channels A and B are acquired. Data 0 is output from the memories associated with the other channels. Of the switches j1 and j2 on the reading side, the switches j1 are closed and the switches j2 are open. Accordingly, a 4-bit extra sample is read out following a 16-bit main sample. As regards the channel A, as the switch SWA is switched, data of the channel A is sequentially output in the order of A0, a0 (4 bits), A1 and a1 (4 bits).

The settings of the individual switches and the switching operations in the above-described embodiment are programmably set in accordance with the number of channels of audio streams and the number of quantization bits of each sample. Such a signal processing mode is described in the video title set attribute table shown in FIG. 14 and the packet header shown in FIG. 7. In other words, audio data included in an audio packet being linear PCM data, the audio frame number, the number of quantization bits, the sampling frequency, the audio channel number, etc. are described.

The decoders illustrated in FIGS. 17 and 18 can handle all the modes and are so-called full decoders that are adaptable in a high-cost machine which can reproduce all the channels.

The concept of this invention relates to a data arranging method, a recording/reproducing method and a processing apparatus, which can handle various kinds of modes established by multifarious combinations of the number of channels and the number of quantization bits. The data arrangement can be adapted to the aforementioned high-cost machine as well as an inexpensive machine which meets the demand for a lower cost, e.g., one which reproduces only 16-bit data of two channels in every mode. Such a machine advantageously a smaller circuit scale than the high-cost machine.

Although the switches which are used to distribute individual samples and acquire samples from the associated memories are illustrated as mechanical switches, they all are electronic circuits.

An audio decoder in a low-cost player will now be described. This audio decoder processes 16-bit data of only the channels A and B. Input samples are of eight channels and the number of quantization bits is 24 bits.

Figure 19:
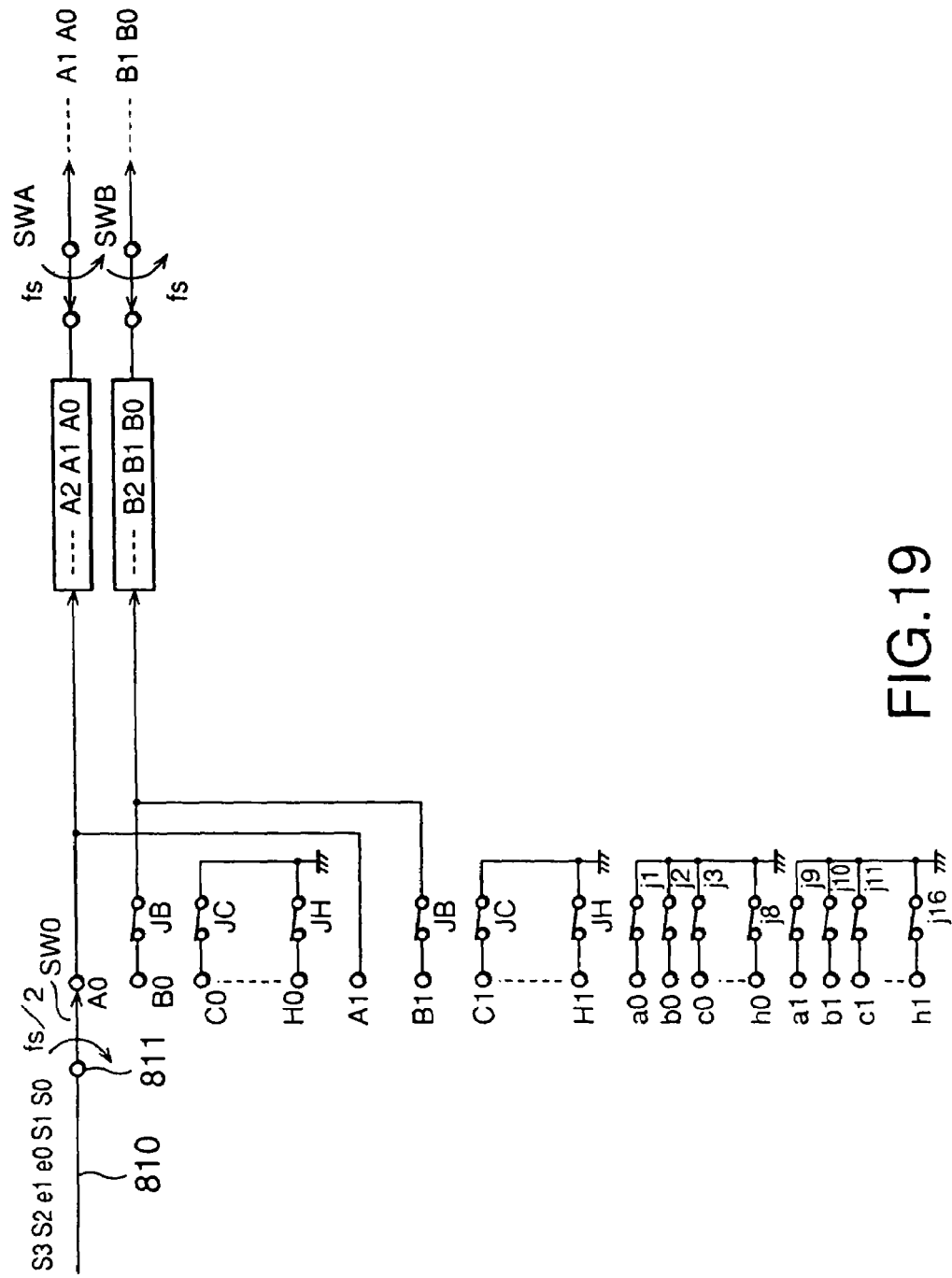
FIG. 19 is a diagram showing a third example of the basic circuit structure of the audio decoder.

A sequence of samples as discussed with reference to FIG. 1 is continuously input to an input terminal 810 in FIG. 19. This sequence of samples is given to the input terminal, 811, of a switch SW0. The switch SW0 has distribution terminals for the individual samples of channels An to Hn and an to hn. The terminals which are associated with samples of the individual channels are given the same reference numerals as representative samples, which are samples A0 to H0, A1 to H1, a0 to h0 and a1 to h1.

It is assumed that the terminals A0 to H0 and A1 to H1 are 16-bit terminals, and the terminals a0 to h0 and a1 to h1 are 4-bit terminals. Since the extra sample may consist of a total of eight bits, two sets of 4-bit terminals, a0 to h0 and a1 to h1, are prepared.

In this decoder, however, only the terminals A0 and A1, and B0 and B1 are respectively connected to the memories MA and MB, with the other terminals C0-H0 and c0-h0 grounded. The switch SW0 may be designed in this manner, or may be designed to have only those systems associated with the channels A and B from the beginning.

The switches SWA and SWB are for reading data from the memories MA and MB in the units of 16 bits. Those switches SWA and SWB operate in such a way that output data are matched with one another.

The operation of this audio decoder will now be discussed.

Samples S0, S1, e0, e1, . . . , which are arranged for the recording/transfer purpose and are to be input to the switch SW0 can be expressed as A0, B0, . . . , H0, A1, B1, . . . , H1, a0, b0, . . . , h0, a1, b1, . . . , h0 as samples of the individual channels. Each main sample of each channel consists of 16 bits, and each extra word consists of 8 bits. The switches of the circuit are all closed. As the rotary switch SW0 is sequentially switched from the topmost contact, associated samples are transferred to the memories MA0 and MB1. The other samples are all discarded.

Thereafter, the samples stored in the memories MA0 and MB1 are read those of the channels A and B.

Because two samples are processed as the rotary switch SW0 turns once, the rotational period should be a half of the sampling frequency fs. Because one sample is read as each of the rotary switches SWA and SWB turns once, the frequency is fs.

Another audio decoder in a low-cost player will now be discussed. This audio decoder processes 16-bit data of only the channels A and B. Input samples are of two channels and the number of quantization bits is 20 bits.

Figure 20:
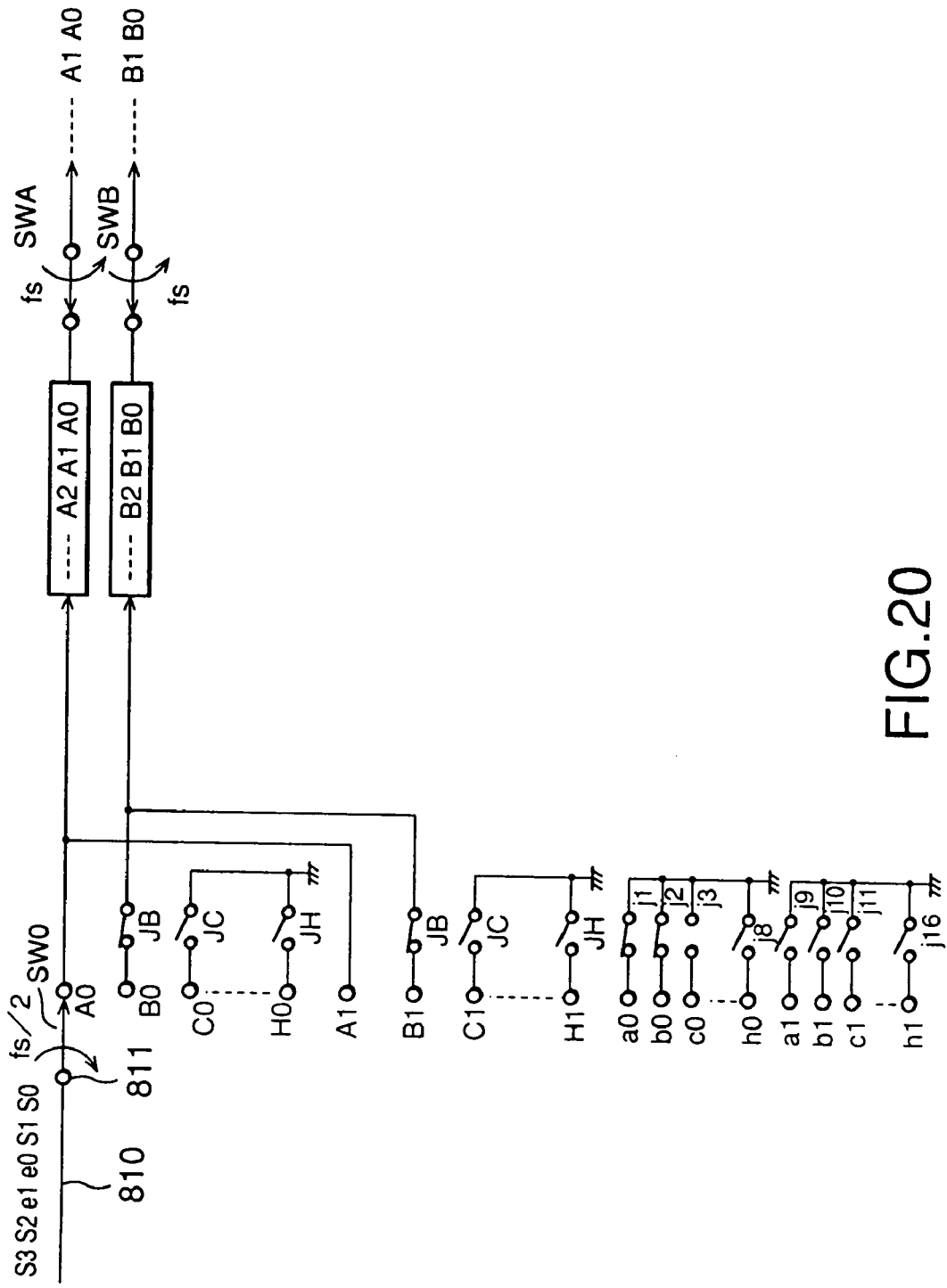
FIG. 20 is a diagram showing a fourth example of the basic circuit structure of the audio decoder.

A sequence of samples as discussed with reference to FIG. 1 is continuously input to the input terminal 810 in FIG. 20. This sequence of samples is given to input terminal 811 of the switch SW0. The switch SW0 has distribution terminals for the individual samples of channels An to Hn and an to hn. The terminals which are associated with samples of the individual channels are given the same reference numerals as representative samples, which are samples B0, A1, B1, a0, h0, a1 and b1.

The terminals A0, B0, A1 and B1 are 16-bit terminals, and the terminals a0, b0, a1 and b1 are 4-bit terminals. To cope with the modes for two channels and the quantization bits of 20 bits, only the switch JB is closed and the switches JC-JH are open. Those switches j1 and j2 which are associated with the terminals a0, b0, a1 and b1 are closed and switches j3–j16 associated with the other terminals are open.

As the rotary switch SW0 is sequentially switched in the above situation, no data transfer is performed. And only the main samples A0, B0, A1 and B1 are transferred to the memories MA and MB. Regarding the extra samples a0, b0, a1 and b1, since their associated switches are grounded, those extra samples are discarded. The operation of reading samples from the memories MA and MB is carried out in the same manner as done in the previously described embodiment.

Although the foregoing description of the low-cost machine has been given with reference to two modes, data of two channels can be acquired in every mode in accordance with the selective open or closed states of the switches. The particular point that should be noted is that processing for extra samples is executed 8 bits by 8 bits. The above-described data arrangement makes the number of bits of one pair of extra samples an integer multiple of 8 bits regardless of the number of channels, even if each extra word of each channel consists of 4 bits. Even when extra samples are to be discarded in a low-cost decoder, therefore, 8-bit processing is possible.

Since the main words of extra samples each consist of 16 bits, they can all be processed 8 bits by 8 bits, which is very advantageous in designing a specific circuit.

Each audio pack has a pack header. As shown in FIG. 21, the pack header consists of a pack start code (4 bytes), a system clock reference (SCR) (6 bytes), a program multiplexing rate (3 bytes) and a pack stuffing length (1 byte). The SCR represents the time required to fetch this audio pack. If the value of the SCR represents is shorter than a reference value in the disk playing apparatus, the audio pack will be stored into the audio buffer.

The control circuit refers to the pack stuffing length and determines an read address on the basis of the pack stuffing length.

FIG. 22 shows the contents of the packet header of an audio packet. The packet header includes a packet_start_code prefix indicative of the start of a packet, a stream ID indicating what data the packet has, and data indicative of the length of the packet stream. Also described in the packet header are various kinds of information of packet elementary stream (PES), such as a flag indicating the inhibition or permission of copy, a flag indicating if the information is original one or copied one, and the length of the packet header. A presentation time stamp (PTS) for synchronization of the output timing of this packet with that of other video data or sub picture is further described in the packet header. Further, information, such as a flag indicating if there is any description on a buffer and the buffer size, is described in the first packet in the first field in each video object.

The packet header also has stuffing bytes of 0 to 7 bytes. The packet header further has a sub stream ID indicating an audio stream, linear PCM or other compressing type, and the number of audio stream. Further described in the packet header are the number of frames of audio data whose first byte is located in this packet. Furthermore, a pointer for a unit to be accessed first is described by the number of logic blocks from the last byte of this information. Thus, the pointer indicates the first audio frame to be decoded first at the time described by the PTS. The pointer indicates the first byte address of that audio frame. Further described in the packet header are an audio emphasis flag indicating whether or not to be emphasized high frequency band, a mute flag for providing mute when audio frame data are all 0, and a frame number indicative of the frame in an audio frame group (GOF) which should be accessed first. Control information, such as the length of a quantized word or the number of quantization bits, the sampling frequency, the number of channels and the dynamic range, is also described.

The above header information is analyzed by a decoder control section (not shown) in the audio decoder. The decoder control section switches the signal processing circuit in the decoder to the signal processing mode which is associated with currently acquired audio data. The switched modes are as discussed with reference to FIGS. 17 to 20. Information like this header information is also described in the video manager, so that when such information is read at the initial stage of the reproducing operation, the information need not be read again thereafter for the reproduction of the same sub stream. The reason why mode information necessary to reproduce audio data is described in the header of each packet as mentioned above is because a receiving terminal can identify the mode of the audio at a whenever reception starts in the case a sequence of packets is transferred by a communication.

Figure 23:
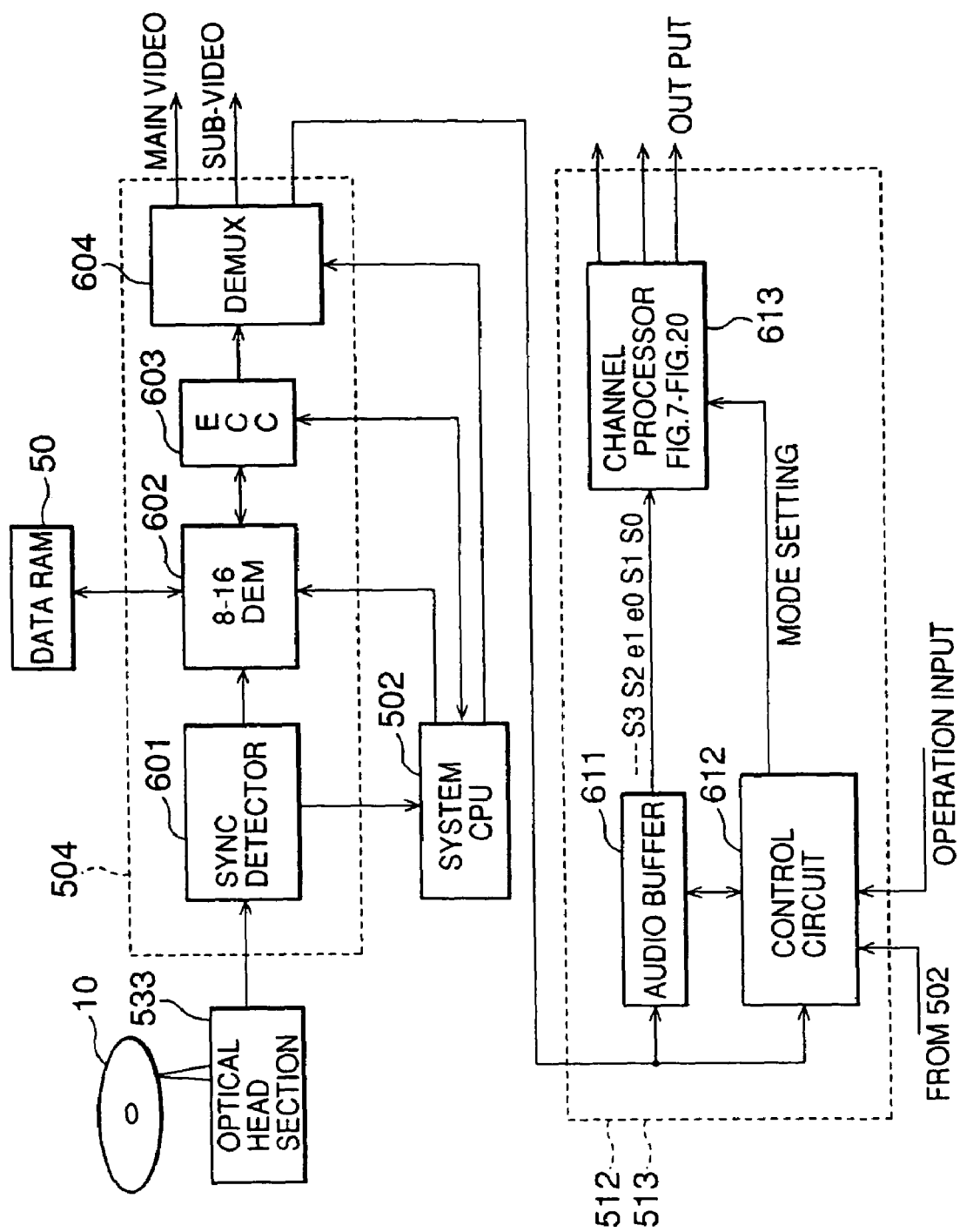
FIG. 23 is a block diagram showing mainly the audio data processing system incorporated in the disk playing apparatus.

FIG. 23 is a block diagram of the audio data processing system incorporated in the disk playing apparatus, illustrating the system processing section 504 and the audio decoder 513 in more detail than FIG. 10.

In the system processing section 504, an input high-frequency signal (read signal) is supplied to a sync detector 601. The detector 601 detects and extracts a sync signal from the read signal and generates a timing signal. The read signal now containing no sync signal is input to a 8-16 demodulator 602, which demodulates the 16-bit signal into a train of 8-bit data. The 8-bit data is input to an error correcting circuit 603. The data output from the circuit 603, which is free of errors, is input to a demultiplexer 604. The demultiplexer 604 processes the data, recognizing the video pack, the sub-picture pack, and the audio pack according to the reference of the stream ID. These packs are supplied from the demultiplexer 604 to the video decoder 508, the sub-picture decoder 509 and the audio decoder 513.

Meanwhile, the audio pack is fetched into an audio buffer 611, and the pack header and packet header of the audio pack are fetched into a control circuit 612. The control circuit 612 recognizes the contents of the audio pack, i.e., the start code, stuffing length, packet start code and stream ID of the audio pack. Further, the control circuit 612 recognizes the sub-stream ID, the first access point, number of quantized audio bits, number of channels and sampling frequency. The stuffing byte length and the padding packet length are determined from these data items thus recognized, on the basis of the table shown in FIG. 8.

The control circuit 612 recognizes the packet of linear PCM based on the sub-stream ID.

As a result, the control circuit 612 can identify the extraction address of the audio data stored in the audio buffer 611. When controlled by the circuit 612, the audio buffer 611 outputs samples such as samples S0, S1, e0, e1, S2, S3, . . . . The control circuit 612 can recognize the number of stuffing bytes and/or the number of padding packets after it has recognized at least the number of quantized bits, the sampling frequency, and the number of audio channels. The circuit 612 can extract data based on these recognized data items.

The samples output from the audio buffer 611 are supplied to a channel processor 613. The processor 613 has a structure of the type shown in FIGS. 17 to 20. Its operating mode is controlled by the control circuit 612.

The audio packet, the video packet, the sub-picture packet and the recording tracks of the optical disk, all described above, have a specific physical relationship, which will be explained below.

Figure 24A:
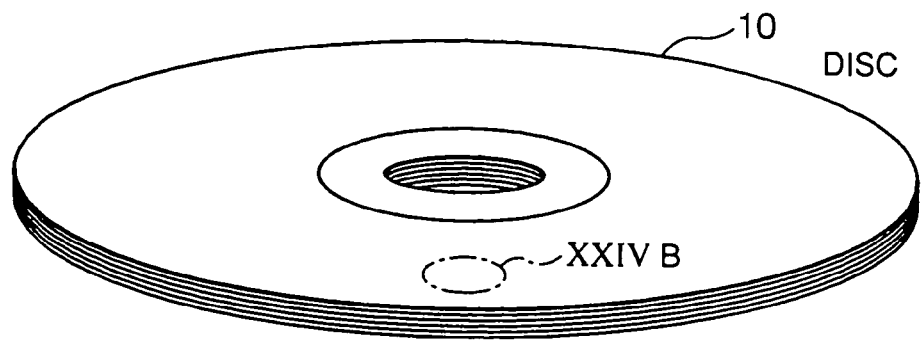
FIGS. 24A–24D are diagrams showing a disk, a pit train, a sector train, and a physical sector, respectively.
Figure 24B:
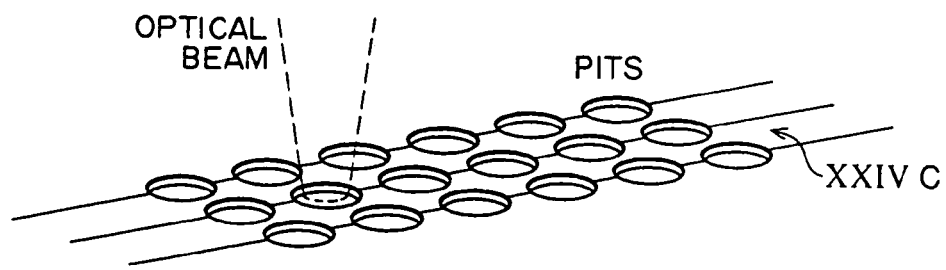
Figure 24C:
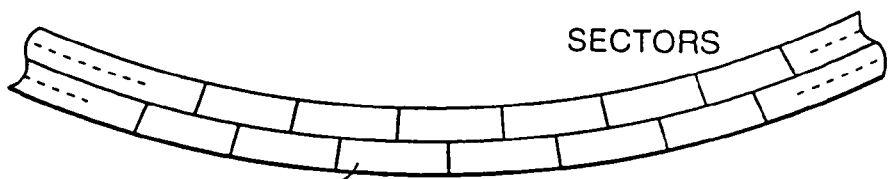
Figure 24D:
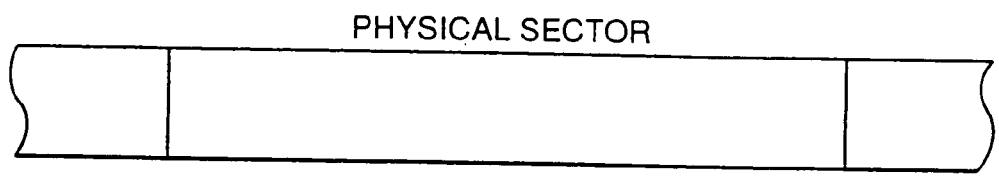

When a part of the recording surface of an optical disk 10 shown in FIG. 24A is magnified, trains of pits are seen as illustrated in FIG. 24B. A set of pit trains constitute a sector as seen in FIGS. 24C and 24D, which are two other magnified views of the optical disk 10. The sectors are sequentially read by the optical head. Then the audio packets are reproduced in real time.

Figure 25A:
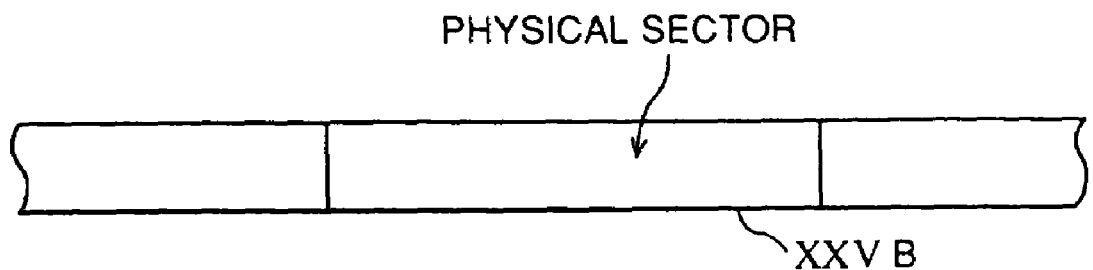
FIGS. 25A and 25B are diagrams showing a physical sector and a table representing the contents of the physical sector, respectively.
Figure 25B:
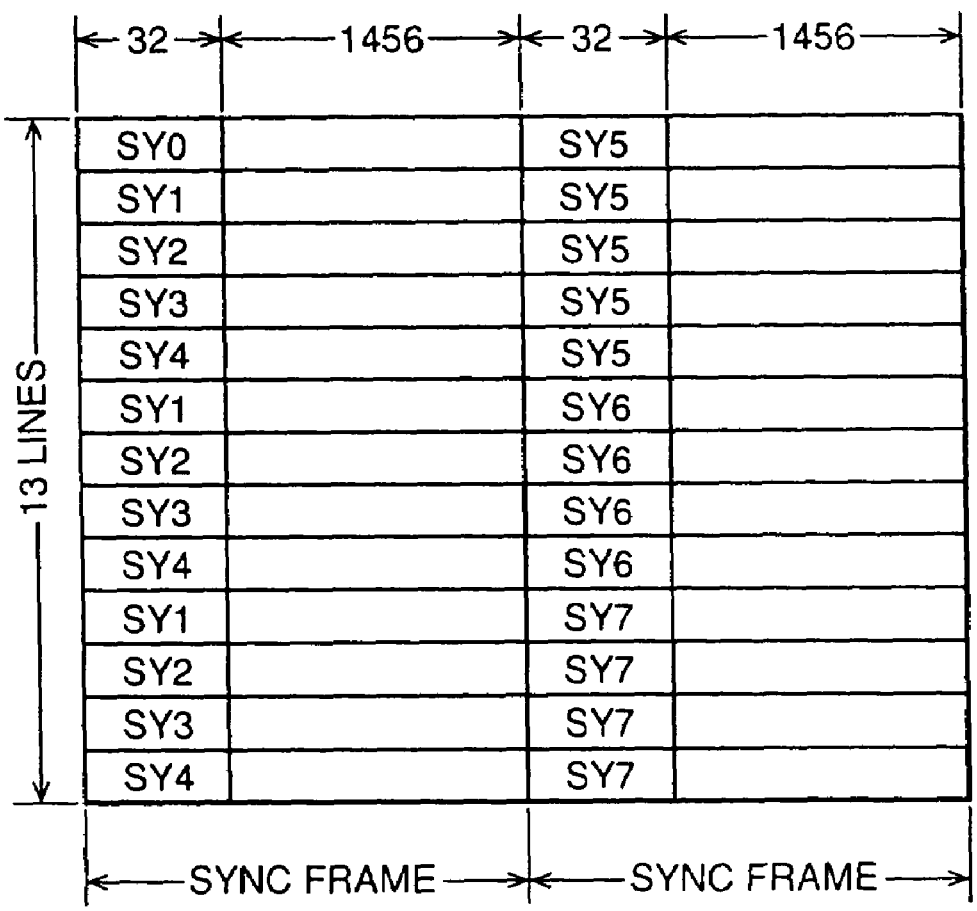

The sectors will be described with reference to FIGS. 25A and 25B. As shown in FIG. 25B, a sector in which audio data is recorded, consists of 13×2 frames. One sync code is assigned to each sector. Although the frames are shown in FIG. 25B as if sequentially arranged in rows and columns, they are sequentially arranged in a single row on one track. More specifically, the frames having sync codes SY0, SY5, SY1, SY2, SY5, . . . are arranged in the order they are mentioned.

The sync code assigned to one frame consists of 32 bits (16 bits×2), and the data recorded in one frame consists of 1456 bits (16 bits×91). This means the sector is expressed by 16-bit modulated code, since 16-bit data items obtained by modulating 8-bit data items are recorded on the optical disk. Also recorded in each sector is a modulated error-correction code.

Figure 26A:
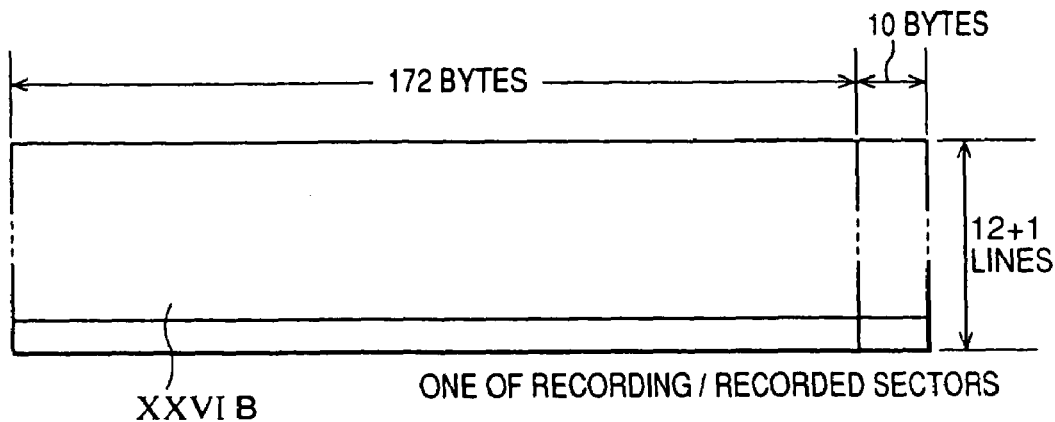
FIGS. 26A and 26B are diagrams showing the structure of a recording/recorded sector.

FIG. 26A shows a sector in which there are 8-bit data items obtained by demodulating the 16-bit data items recorded in the physical sector described above. The amount of data in this sector is: (172+19) bytes×(12+1) lines. Each line contains a 10-byte error-correction code. One correction code is provided for each line. When twelve correction codes for twelve lines, respectively, are collected, they function as an error-correction code for twelve columns.

Figure 26B:
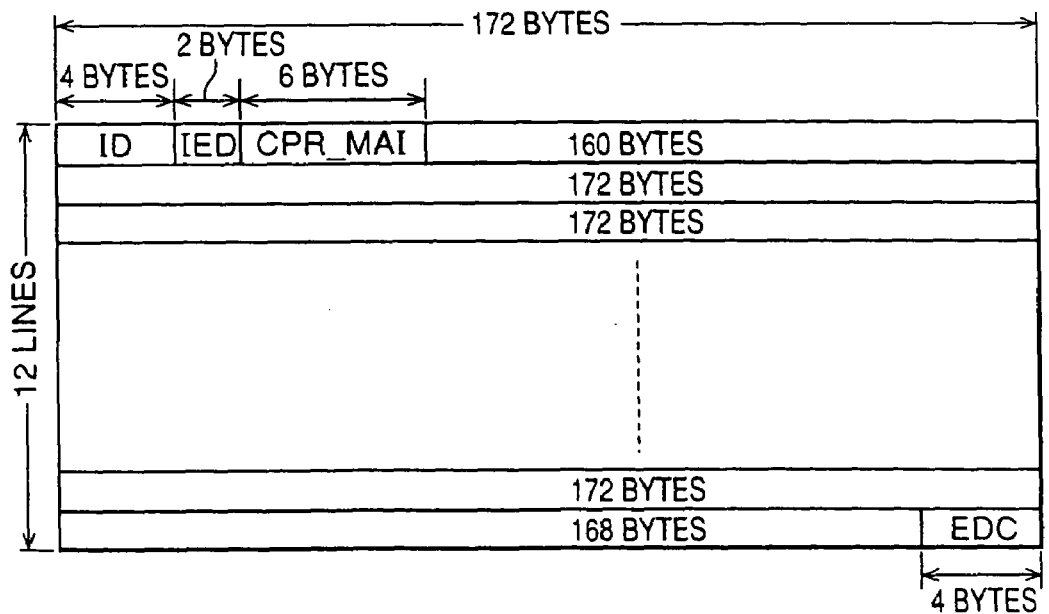

The data recorded in one recording/recorded sector becomes a data block of the type shown in FIG. 26B when the error-correction signal is removed from it. The data block consists of 2048-byte main data, 6-byte sector ID, a 2-byte ID error-detection code, 6-byte copyright management data, and a 4-byte error-detection code. As FIG. 26B shows, the sector ID, ID error-detection code and the copyright management data are added to the head of the main data, whereas the error-detection code is added to the end of the main data. The 2048-byte main data is one pack as defined above. A pack header, packet header, and audio data are described in the pack, in the order mentioned from the head of the pack. In the pack header and the packet header there are described various items of guide information which will be used to process the audio data.

As indicated above, one packet which consists of audio samples arranged in a specific way is recorded in each recording/recorded sector on the disk. The audio decoder can reproduce linear PCM data in a desired manner despite that the PCM data is recorded in one recording/recorded sector. This is because the start part of the audio data contained in any pack is the start part of the main sample, and also because the pack header and the packet header contain control data sufficient for the audio decoder to process audio data.

An error-correction code (ECC) block will be described, with reference to FIGS. 27A and 27B.

Figures 27A, 27B:
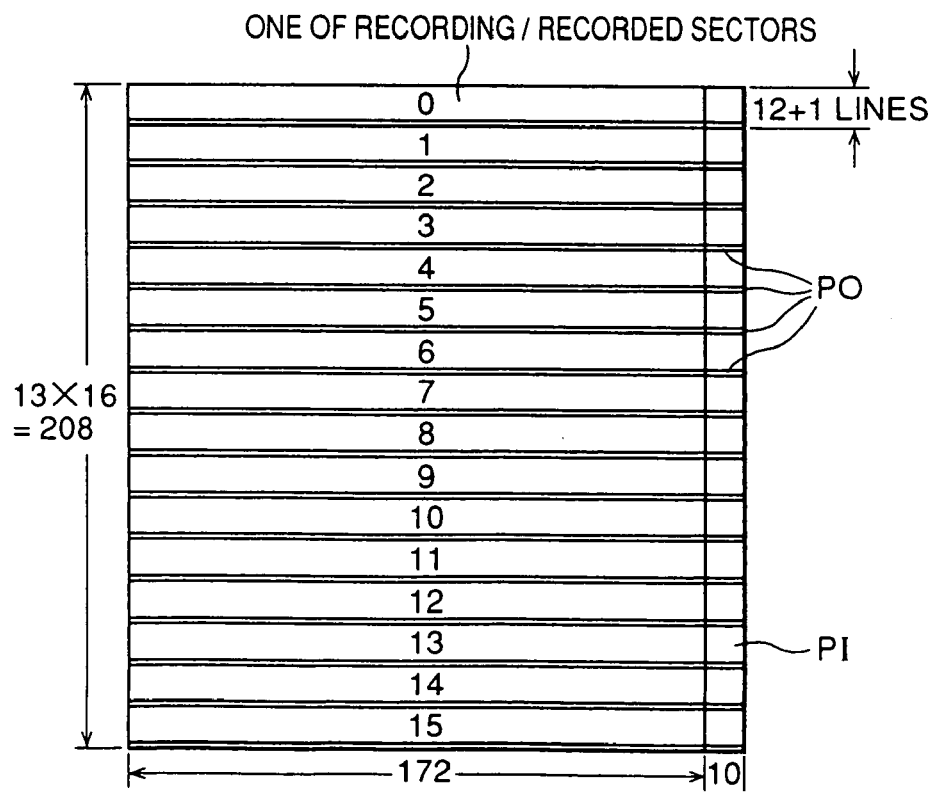
FIGS. 27A and 27B are diagrams illustrating an error-correction code block.

As shown in FIG. 27A, the ECC block consists of 16 recording/recorded sectors. As shown in FIG. 26A, each sector can record 12 lines of data, each line being a 127-byte data item. A 16-byte outer parity (PO) is added to each column, and a 10-byte inner parity (PI) is added to each line. As shown in FIG. 27B, the 16-byte outer parity (PO) is distributed, one bit to each line. As a result, one recording/recorded sector holds 13 lines (12+1) of data. In FIG. 27A, "B0, 0, B0, 1, 2, . . . 15" designate the 16 recording/recorded sectors, respectively.

The video packs, sub picture packs and audio packs are interlaced on the track of the disk. However, this invention is not limited to this arrangement of the packs. This invention can be applied to the disk which only the audio packs are arranged, or the disk which the audio packs and sub packs are arranged, or the disk which the audio packs, sub packs and NAV packs are arranged. It is free to combine the packs with each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording medium on which processed quantized data obtained by sampling one channel or multi-channel signals in a time sequential manner is recorded and reproduced, wherein:

said data recorded on said recording medium has a form in which M-bit sample data of each channel signal is separated into a main word consisting of m1 bits on an MSB(Most Significant Bit) side and an extra word consisting of m2 bits on an LSB(Least Significant Bit) side, a collection of main words of 2n-th sample data of individual channels is arranged as a main sample S2n1 a collection of main words of (2n+1)-th sample data of individual channels is arranged next as a main sample S2n+1, a collection of extra words of 2n-th sample data of individual channels is then arranged as an extra sample e2n, and collection of extra words of (2n+1)-th sample e2n+1 (where n=0,1,2, . . . ), said data is a collection of said main samples S2n, S2n+1 and said extra samples e2n, e2n+1 as an unit, a frame is formed by a collection of a predetermined number of samples and is assigned to one or more audio packets which are arranged, mixed with video packets and sub picture packets, between control packets, each of said packets has a predetermined byte length, when a plurality of main and extra samples are arranged in each of said one or more audio packets, a top of a first main sample is placed at a predetermined position in each of said one or more audio packets and other samples are sequentially arranged after said first main sample, a total byte length of said plurality of main and extra samples is equal to or smaller than a maximum byte length of each of said one or more audio packets, when said total byte length is less than said maximum byte length, invalid data of a stuffing byte or a padding packet is inserted in a remaining portion, and a pack includes a pack header, a packet and, a packet header, said packet header is attached to a data section in which said sample data is stored in each pack, said packet header includes at least a first access unit pointer, quantization bit data, a sampling frequency, and channel information regarding the quantized data, a pack header is attached to said packet header, said pack header includes information representing a stuffing length.

2. A recording medium as claimed in claimed 1, wherein said pack contains information representing a program multiplexing rate.

3. A reproducing apparatus for reproducing data from a recording medium as claimed in claim 1, said reproducing apparatus comprising:

an input terminal for receiving an array of packs;

a control circuit for analyzing contents of said pack header and said packet header;

input means for classifying the samples received at said input terminal according to channels and for outputting a sample word corresponding to each channel, said input means controlled by said control circuit;

a plurality of memory devices for storing said sample word output from said input means, said plurality of memory devices controlled by said control circuit; and a plurality of output means for outputting said sample word from said input means, said plurality of output means controlled by said control circuit.

4. A recording medium on which processed quantized data obtained by sampling one channel or multi-channel signals in a time sequential manner is recorded and reproduced, wherein:

said data recorded on said recording medium has a form in which M-bit sample data of each channel signal is separated into a main word consisting of m1 bits on an MSB(Most Significant Bit) side and an extra word consisting of m2 bits on an LSB(Least Significant Bit) side, a collection of main words of 2n-th sample data of individual channels is arranged as a main sample $S_{2n}$, a collection of main words of (2n+1)-th sample data of individual channels is arranged next as a main sample $S_{2n+1}$, a collection of extra words of 2n-th sample data of individual channels is then arranged as an extra sample $e_{2n}$, and collection of extra words of (2n+1)-th sample $e_{2n+1}$ (where n=0,1,2, . . . ), said data is a collection of said main samples $S_{2n}$, $S_{2n+1}$ and said extra samples $e_{2n1}$ $e_{2n+1}$ as an unit a frame is formed by a collection of a predetermined number of samples and is assigned to one or more audio packets which are arranged, mixed with video packets and sub picture packets, between control packets, each of said packets has a predetermined byte length, when a plurality of main and extra samples are arranged in each of said one or more audio packets, a top of a first main sample is placed at a predetermined position in each of said one or more audio packets and other samples are sequentially arranged after said first main sample, a total byte length of said plurality of main and extra samples is equal to or smaller than a maximum byte length of each of said one or more audio packets, when said total byte length is less than said maximum byte length, invalid data of a stuffing byte or a padding packet is inserted in a remaining portion, and a pack includes a pack header, a packet and, a packet header, said packet header is attached to a data section in which said sample data is stored in each pack, said packet header includes at least a first access unit pointer, quantization bit data, a sampling frequency, and channel information regarding the quantized data, the packet header including a stuffing byte area, and a pack header is attached to said packet header.

* * * * *